United States Patent
Nandwani et al.

(10) Patent No.: US 12,411,933 B2
(45) Date of Patent: *Sep. 9, 2025

(54) METHOD AND APPARATUS FOR A DATA CONFIDENCE INDEX

(71) Applicant: PayPal, Inc., San Jose, CA (US)

(72) Inventors: Suneet Nandwani, San Jose, CA (US); Jie Zou, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,925

(22) Filed: Nov. 1, 2023

(65) Prior Publication Data
US 2024/0220598 A1    Jul. 4, 2024

Related U.S. Application Data

(63) Continuation of application No. 16/736,742, filed on Jan. 7, 2020, now Pat. No. 11,841,937, which is a
(Continued)

(51) Int. Cl.
*G06F 21/40* (2013.01)
*G06F 21/44* (2013.01)
*H04L 9/40* (2022.01)

(52) U.S. Cl.
CPC ............ *G06F 21/44* (2013.01); *H04L 63/105* (2013.01)

(58) Field of Classification Search
CPC ................................ G06F 21/44; H04L 63/105
See application file for complete search history.

(56) References Cited

U.S. PATENT DOCUMENTS 7,302,617 B2    11/2007  Wookey
7,707,192 B1 *   4/2010  Lu .......................... G06Q 10/00
                                                              707/688
(Continued)

FOREIGN PATENT DOCUMENTS

AU    2012241193 A1    11/2012
AU    2013100910 A4 *  8/2013  ............. G06Q 10/06

OTHER PUBLICATIONS

AU2013100910 (Year: 2013).*

*Primary Examiner* — Mahesh H Dwivedi

(57) ABSTRACT

Techniques for using a data confidence index are presented herein. In one embodiment, a method includes maintaining, by a server system, confidence index values corresponding to a set of computing assets that are available to the server system to provide a computing service over a network to remote client devices. The confidence index values are indicative of a readiness of the corresponding computing assets in providing the computing service. The method further includes receiving from a first client device a request for a computing resource associated with the computing service and comparing one or more first confidence index values for a first computing asset of the set of computing assets to one or more second confidence index values for a second computing asset of the set of computing assets. The method also includes selecting data from the one of the first computing asset of second computing asset having confidence index values indicating a greater readiness for providing data and using the selected data to respond to the request.

20 Claims, 12 Drawing Sheets

Related U.S. Application Data continuation of application No. 14/498,772, filed on Sep. 26, 2014, now Pat. No. 10,528,718.

(60) Provisional application No. 61/883,903, filed on Sep. 27, 2013.

(56) References Cited

U.S. PATENT DOCUMENTS

| | | | |
|---|---|---|---|
| 7,925,472 B2* | 4/2011 | Nasr | G06Q 10/10 |
| | | | 700/28 |
| 8,234,238 B2 | 7/2012 | Keith, Jr. | |
| 8,473,339 B1 | 6/2013 | McKennon et al. | |
| 8,543,582 B1 | 9/2013 | Granstrom | |
| 8,630,741 B1 | 1/2014 | Matsuoka et al. | |
| 8,990,639 B1* | 3/2015 | Marr | G06F 11/3672 |
| | | | 714/25 |
| 9,043,658 B1 | 5/2015 | Marr et al. | |
| 9,419,913 B2* | 8/2016 | Ferris | G06F 9/5072 |
| 9,887,889 B1 | 2/2018 | Dippenaar | |
| 10,373,218 B1 | 8/2019 | Jenkins et al. | |
| 10,924,562 B1* | 2/2021 | Xiao | H04L 67/535 |
| 11,086,648 B1* | 8/2021 | De Kadt | G06F 9/45537 |
| 2004/0260801 A1 | 12/2004 | Li | |
| 2005/0021384 A1 | 1/2005 | Pantaleo et al. | |
| 2005/0086300 A1 | 4/2005 | Yeager et al. | |
| 2005/0149481 A1 | 7/2005 | Hesselink et al. | |
| 2006/0212930 A1 | 9/2006 | Shull et al. | |
| 2006/0224479 A1* | 10/2006 | Bishop | G06Q 40/04 |
| | | | 705/35 |
| 2007/0143851 A1* | 6/2007 | Nicodemus | H04L 63/1433 |
| | | | 726/4 |
| 2008/0154695 A1* | 6/2008 | Wolfe | G06Q 30/02 |
| | | | 705/7.11 |
| 2008/0201464 A1 | 8/2008 | Campbell et al. | |
| 2009/0024629 A1 | 1/2009 | Miyauchi | |
| 2009/0300422 A1 | 12/2009 | Grichnik et al. | |
| 2010/0011048 A1 | 1/2010 | Morris | |
| 2010/0106558 A1 | 4/2010 | Li et al. | |
| 2010/0268776 A1 | 10/2010 | Gerke | |
| 2013/0018868 A1 | 1/2013 | Chi et al. | |
| 2013/0104236 A1 | 4/2013 | Ray et al. | |
| 2013/0227712 A1* | 8/2013 | Salem | G06F 21/6218 |
| | | | 726/30 |
| 2014/0093156 A1 | 4/2014 | Gawne | |
| 2014/0215575 A1* | 7/2014 | Hoyos | H04L 63/105 |
| | | | 726/4 |
| 2014/0278808 A1* | 9/2014 | Iyoob | G06Q 30/0206 |
| | | | 705/7.35 |
| 2014/0280300 A1 | 9/2014 | Ottenfelt et al. | |
| 2014/0281741 A1 | 9/2014 | Bohacek | |
| 2014/0283031 A1 | 9/2014 | Eksten et al. | |
| 2014/0317687 A1 | 10/2014 | Ukil | |
| 2014/0365264 A1 | 12/2014 | Smiley et al. | |
| 2015/0121134 A1* | 4/2015 | Wipfel | G06F 11/2094 |
| | | | 714/6.31 |
| 2015/0341240 A1* | 11/2015 | Iyoob | G06Q 30/0631 |
| | | | 709/201 |
| 2016/0314022 A1* | 10/2016 | Pabari | H04L 41/0823 |
| 2017/0213178 A1* | 7/2017 | Todd | H04L 67/12 |
| 2017/0230306 A1 | 8/2017 | Cropper et al. | |

* cited by examiner

STATE CONFIDENCE

440

 Cold Cache HOW IS THE INDEX CALCULATED?
◇ Start with 50
◇ Set to 100 if asset last audit within one year
Set to 90% if asset status is changed within last 1 year
Set to 60% if asset status is changed within last 2 years
◇ Set to 10% if the asset has node servers
Set to 10% if asset has mini OS or OS installed
Set to 0% if the asset is non MP Reserved Resources

EXISTENCE CONFIDENCE

420

 HOW IS THE INDEX CALCULATED?
◇ Initial to be 0
◇ Set to 100% if asset is on the network within last 30 days (from NetDB)
Set to 90% if asset is on the network within last 60 days (from NetDB)
Set to 80% if asset is on the network within last 90 days (from NetDB)
Set to 70% if asset is on the network within last 180 days (from NetDB)
Set to 90% if asset is physically scanned within last 1 year
Set to 80% if asset is physically scanned within last 2 years
Set to 70% if asset is physically scanned within last 3 years
Set to 50% if asset is in CDB and not in disposed status
Boost 50% is non-disposed asset is managed by status
Boost 40% if non-disposed asset status changed within 90 days
Boost 30% if non-disposed asset status changed within 1 year
Boost 20% if non-disposed asset status changed within 2 year
Boost 10% if non-disposed asset status changed within 3 year
Detract 50% if asset has no data center
Detract 50% if asset has no manufacture
Detract 50% if asset has no model
Detract 50% if asset manufacture indicates it is not a server
Set maximum value to 100
Set minimum value to 0

FIG. 4

METHOD AND APPARATUS FOR A DATA CONFIDENCE INDEX

CROSS-REFERENCE TO RELATED APPLICATIONS

This application is a continuation of U.S. patent application Ser. No. 16/736,742, filed Jan. 7, 2020, which is a continuation of U.S. patent application Ser. No. 14/498,772, filed on Sep. 26, 2014, now U.S. Pat. No. 10,528,718, issued on Jan. 7, 2020; which claims the benefit of U.S. Patent Application Ser. No. 61/883,903, filed on Sep. 27, 2013; the disclosures of which are incorporated herein by reference in their entireties.

TECHNICAL FIELD

The present application relates generally to the technical field of data processing and, in particular, to confidence in data stored in a field of a data structure.

BACKGROUND

A data confidence index is a value assigned to data in a field of a data structure in storage, and indicates the confidence a user may have in the data residing in that field. Depending on the meaning represented by the data, a data confidence index may allow a user to answer questions that were difficult, or perhaps impossible, to answer, such as the following, among others: How efficient is a user's supply chain? Can the user accurately determine chargeback information to bill the user's customers? What is the optimal amount of hardware to run a particular process of a publication system?

BRIEF DESCRIPTION OF THE DRAWINGS

Some embodiments are illustrated by way of example and not limitation in the figures of the accompanying drawings in which:

FIG. 4 is a diagram illustrating the concept of data confidence, according to an example embodiment;

DETAILED DESCRIPTION

Figure 1:
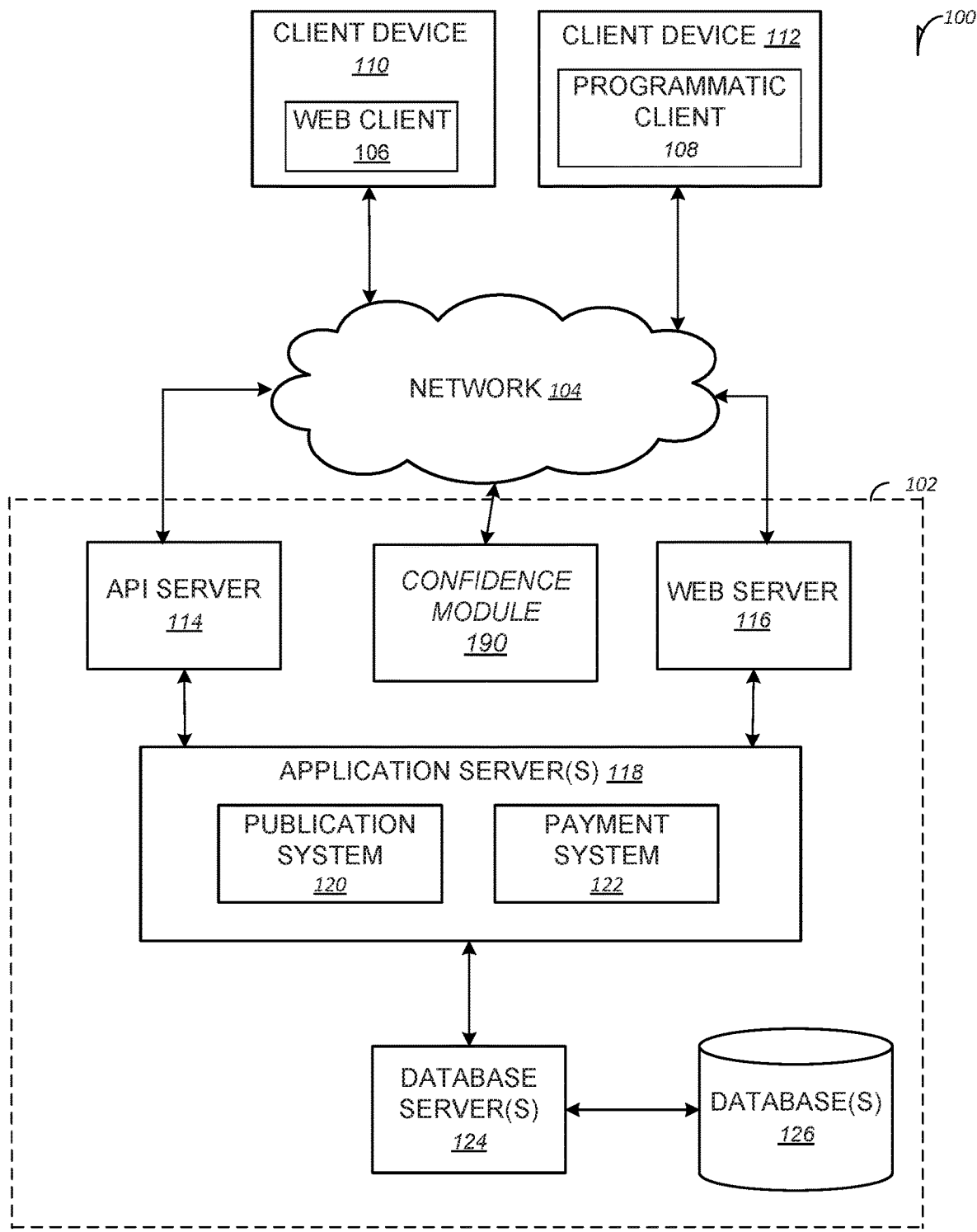
FIG. 1 is a block diagram illustrating a network system, according to example embodiments.

In a network of cooperating assets, or cooperating computing devices, the various assets may perform functions to support purposes of the network. For example, a database server, a web server, an authentication server, or the like, may cooperate to publish content to client devices. In another example, many database servers may cooperate to provide data to client devices. In one example, a network of cooperating devices may include a cloud platform. A cloud platform, as described herein, may include a group of computing devices providing storage, processing resources, services, applications, or the like, to one or more remote users.

An asset, as described herein, may include any of the following: a physical machine, virtual machine, an application, a physical server, a virtual server, a service, a computing device, or other device, or the like. An asset may include an independent computing device connected to a network. In another embodiment, an asset may include a service operating on more than one physical machine. In one example, an asset may include a database server that may store data on many storage devices. Therefore, an asset may or may not be restricted to a single physical device.

In one example, an asset such as a backup database server may functionally take over a primary database server in response to the primary failing to perform some function. In one example, a primary database may fail to respond to a database query for a period of time. In response, a DNS server may alter name resolution for the primary to direct database queries to the backup database server as one skilled in the art may appreciate.

In another example, several database servers may respectively store portions of a large database (perhaps a database that may be too large to store on a single asset) and may cooperatively publish data according to a request from a client device. In a further example, four database servers may include three primary servers and a parity server. In this example, in response to one of the three database servers failing to respond, requested data may be constructed from the remaining database servers using the parity server as one skilled in the art may appreciate. Therefore, in many examples, many devices may cooperate on a network to provide requested data, publish data, store data, or to perform other functions.

In a network of cooperating devices, it may be useful to monitor a functional state of the various devices and/or determine a confidence index for some of the devices. Such a confidence index may indicate reliability of data provided by the device. Monitoring the cooperating devices may help ensure that the cooperating devices are providing reliable data because a system may have more confidence in data provided by a server with a high confidence index and may trust data provided by a server with a lower confidence index less.

A confidence index may include a real numeric value, an index into an array of values, a percentage, or other value. A confidence index may be an integer or a real number. In one example, a confidence index may be a percentage from 0% (indicating no trust in the asset or data) to 100% (indicating complete trust in the asset or data). A confidence index of 50% may indicate that the asset may or may not exist or provide correct data. In another example, the confidence index may be a numerical value with or without range limits. For example, a confidence index may range from 0 (indicating no trust in the asset or data) to 1000 (indicating complete trust in the asset or data provided by the asset). In one example, the confidence index may be represented by any number wherein higher numbers indicate higher confidence that the asset exists, is in a specific state, higher confidence in data provided by the asset. Of course, one skilled in the art may recognize other ways in which a confidence index may be represented and this disclosure is not limited in this regard.

In one example, two database servers may provide similar data in response to a request. Supposing a first database server has a confidence index of 80% and a second database server has a confidence index of 50%, the system may consider data provided by the database with the 80% confidence index before considering data provided by the database with the 50% confidence index. In certain examples, an asset that communicates more frequently with other devices of the cooperating network may have more updated data and may receive a higher confidence index. In another example, an asset that has not been physically scanned for a year or more may be less trusted to provide reliable data. In another example, a device with a sufficiently low confidence index may be disqualified from participation in the network of cooperating devices.

Therefore, in a network of cooperating computing assets, a system may determine confidence indexes for each of the assets and may rely more on assets with higher confidence indexes than on assets with lower confidence indexes.

A data confidence index may include a confidence measurement approach, or algorithm, to give a quantitatively expressed reduction of uncertainty based on one or more observations. While discussed herein in terms of a hardware asset for running a process in a publication system, embodiments may be used for many other areas where confidence in data is desired or required. In one example, an algorithm may be implemented in serial steps. An algorithm, which may be viewed as a series of rules that apply to the asset, may be executed, in one embodiment, one by digital computer in a defined order. Steps of the algorithm may comprise a pre-condition, an assertion, and an action, as discussed in more detail subsequently.

FIG. 1 is a network diagram depicting a network system 100, according to one embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 may be coupled to, and provide programmatic and web interfaces respectively to, one or more application servers 118. The application server(s) 118 may host one or more publication application(s) of publication system 120 and one or more payment systems 122. The application server(s) 118 may be coupled to one or more database server(s) 124 that facilitate access to one or more database(s) 126.

In one embodiment, the web server 116 and the API server 114 may communicate and/or receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., programmatic client 108) running on another client device (e.g., client device 112).

In another embodiment, the publication system 120 may include a confidence module 190 configured to determine a confidence index for one or more other servers 114, 116, 118, 120, 122, 124, 130 (FIG. 2), 132 (FIG. 2) in the publication system. For example, the confidence module 190 may determine a confidence index for the web server 116, the API server 114, an application server 118, and/or the database server(s) 124. Of course, the confidence module 190 may determine a confidence index for other servers and this disclosure is not limited in this regard.

In one embodiment, the confidence module 190 may monitor network communication by one or more assets and may increase a confidence index for an asset in response to detecting network communication by the asset. For example, the confidence module 190 may packet sniff a network to determine whether the asset is communicating on the network 104, as one skilled in the art may appreciate. In another example, an asset may be configured to periodically ping the confidence module 190. The confidence module 190 may reduce a confidence index for an asset in response to detecting no network communication for a period of time.

For example, in response to not detecting network communication from an asset for more than a month, the confidence module 190 may lower a confidence index for the asset to 90%. In another example, in response to not detecting network communication from an asset for more than 3 months, the confidence module 190 may lower a confidence index for the asset to 70%. As time increases for when the asset has last communicated on the network 104, the confidence module 190 may correspondingly reduce the confidence index for the asset.

In one embodiment, the confidence module 190 may track an inventory database to determine times when an asset has been physically scanned. The confidence module 190 may reduce a confidence index for the asset in response to increasing time when the asset was last physically scanned. For example, a user may periodically scan assets to track physical inventory of computing devices. The inventory records may be uploaded to a database server 124. The confidence module 190 may monitor data records indicating physical scans for the various assets by requesting corresponding records from the database server 124.

In one example, the confidence module 190 my decrease the confidence index for the asset to 90% in response to no database record indicating that the asset has been physically scanned in the past year. In another example, the confidence module 190 may decrease the confidence index for the asset to 80% in response to no database record indicating that the asset has been physically scanned in the past two years. Of course, the confidence module 190 may decrease the confidence to other values based, at least in part, on a time for a recent physical scan for the asset, and this disclosure is not limited in this regard.

In one embodiment, the confidence module 190 may increase a confidence index for an asset in response to the asset being managed by a network manager. As one skilled in the art may appreciate, a network manager may monitor activity of other devices on the network 104. The network manager may report communication statistics, responsiveness, or other characteristics of an asset communicating on a network. A network manager may or may not include certain assets. In one example, the confidence module 190 may increase a confidence index for an asset in response to a network manager managing the asset. One example of a network manager includes network tracking database (NetDB). Another example of a network manager is Oracle® Integrated Lights Out Manager (ILOM). Another example includes a "Stratus" application. Of course one skilled in the art may recognize other network managing applications and the confidence module 190 may communicate with any network managing applications to determine a confidence index for an asset.

In one embodiment, the confidence module 190 may determine a confidence index for an asset in response to the asset changing from one state to another. In one example, the confidence module 190 may decrease the confidence index for an asset in response to the asset changing from one state to a "cold cache" state as described herein. In another example, the confidence module 190 may increase the confidence index for the asset in response to the asset changing to the "warm cache" state as described herein. In another example, the confidence module 190 may increase the confidence index for an asset in response to the asset changing to an "allocated" state as described herein.

In another embodiment, the confidence module 190 may determine that an asset has entered a "faulty" state. In one example, an asset may report that it has experienced an error, by transmitting a message to the confidence module 190. In response, the confidence module 190 may decrease a confidence index for the asset.

In another example, the confidence module 190 may decrease the confidence index for the asset in response to the asset operating beyond a threshold period of time. For example, a mean-time-between-failure (MTBF) time threshold value may have been exceeded by the asset. In another example, a user for an asset may designate the asset as "end of life" as described herein. In response, the confidence module 190 may decrease the confidence index for the asset.

In one embodiment, the confidence module 190 may increase or decrease a confidence index for an asset in response to the asset being associated with a specific data center. In one example, the confidence module 190 may designate a first data center to be more reliable than a second data center. For example, the first data center may include newer facilities, while the second data center may include aged facilities, may have experience power problems, or other conditions that may affect the reliability of the data center. Therefore, assets that are physically located at the first data center may be less prone to failure and/or may be more reliable. Of course, one skilled in the art may recognize other conditions that may increase or decrease reliability of assets at a specific data center; this disclosure is meant to include all such conditions. Therefore, in certain embodiments, the confidence module 190 may increase or decrease a confidence index in response to an asset being physically located on a specific data center.

In another embodiment, the confidence module 190 may adjust a confidence index for an asset in response to missing information regarding the asset. In one example, the confidence module 190 may decrease a confidence index for an asset in response to missing a manufacturer identifier for the asset. Other relevant information regarding an asset may include a brand, a model number, a serial number, or the like. An asset that includes complete identifying information may be more relied upon to provide accurate data than an asset that includes unknown information.

In another embodiment, the confidence module 190 may increase a confidence index for an asset in response to the asset having node servers. An asset that consistently communicates and transfers data to one or more node servers may more likely include up-to-date information. In one example, an asset may include three different node servers to facilitate distribution or storage of information. The confidence module 190 may determine that the asset has node servers and may adjust the confidence index accordingly.

In another embodiment, the confidence module 190 may adjust a confidence index for an asset in response to the asset having a DNS entry in a DNS server. An asset that is included in a DNS server's list of assets may be more relied upon to provide up-to-date or correct information. Therefore, the confidence module 190 may increase a confidence index for an asset in response to a DNS server for the network (e.g., network 104) including the asset. In another example, an asset without a DNS entry may indicate less connectivity to other assets on the network and the confidence module 190 may decrease a confidence index accordingly.

An asset, as described herein, may include hardware systems, software applications, virtual machines, virtual services, or the like. In one example, a hardware system may operate several virtual machines that perform as assets. The virtual machine may operate a web server as one asset and a database server as another asset. Although the web server and the database server may physically operate on the hardware system, they may both concurrently operate as distinct systems, executable code, applications, operating systems, or the like.

In one embodiment, the servers 114, 116, 118, and 124 may be included in a network of cooperating devices. For example, the servers 114, 116, 118, and 124 may cooperate to provide reliable publication of content on the network 104. In another embodiment, the confidence module 190 may determine a confidence index for one of the servers 114, 116, 118, 124 and may disqualify the server from participation in the network of cooperating devices based, at least in part, on the resulting confidence index.

In one example, the confidence module 190 may determine that a confidence index for the database server(s) 124 is below a confidence index threshold. In response, the confidence module 190 may disqualify the database server(s) 124 from participation in the network of cooperating servers. In one example, a backup database server may be connected to substantially perform functions of the database server(s) 124. In another example, other database servers may respond to database queries until the database server(s) 124 is repaired, or otherwise put back into service.

In another embodiment, the confidence module 190 may determine a confidence index for data provided by a server based, at least in part, on results of determining the confidence index for the server. In one example, the confidence module 190 may have determined confidence indexes for a reputation server and a second reputation server. A reputation server may collect and/or store reputation information for users of the network 104. In response to a query for reputation information, the two reputation servers may both respond. In response to the first reputation server having a confidence index of 90% and the second reputation server having a confidence index of 70%, the confidence module 190 may determine that the data from the first reputation server may be more accurate than data from the second reputation server.

The publication system 120 may publish content on the network 104 (e.g., the Internet). As such, the publication system 120 may provide a number of publication and marketplace functions and/or services to users that access the network-based publisher 102. For example, the publication application(s) of publication system 120 may provide a number of services and functions to users for listing goods and/or services for sale, facilitating transactions, and reviewing and providing feedback about transactions and associated users. Additionally, the publication application(s) of publication system 120 may track and/or store data and metadata relating to products, listings, transactions, and user interaction with the network-based publisher 102. The publication application(s) of publication system 120 may aggregate the tracked data and metadata to perform data mining to identify trends or patterns in the data. While the publication system 120 may be discussed in terms of a marketplace environment, it may be noted that the publication system 120 may be associated with a non-marketplace environment.

The payment system 122 may provide a number of payment services and functions to users. The payment system 122 may allow one or more users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 may also facilitate payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that may be separate and distinct from the network-based publisher 102.

Application Server(s)

Figure 2:
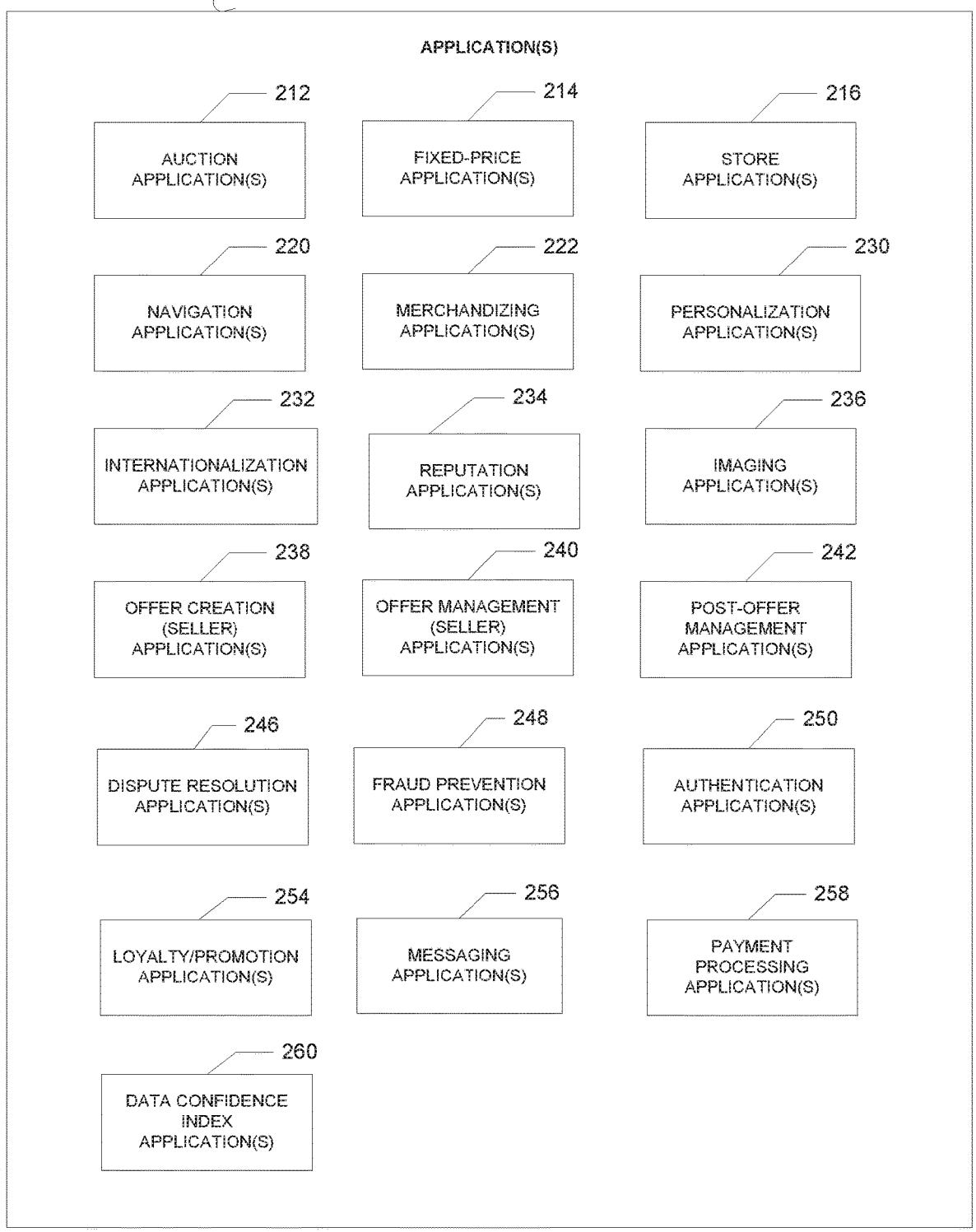
FIG. 2 is a block diagram of applications of application server(s) that may form a part of the network system of FIG. 1, according to example embodiments.

FIG. 2 illustrates a block diagram showing applications of application server(s) 118 that may be part of the network system 100, in an example embodiment. In this embodiment, the publication system 120 and the payment system 122 may be hosted by the application server(s) 118 of the network system 100. The publication system 120 and the payment system 122 may be hosted on dedicated or shared server machines (not shown) that are communicatively coupled to enable communications between server machines. The applications themselves may be communicatively coupled (e.g., via appropriate interfaces) to each other and to various data sources, so as to allow information to be passed between the applications or so as to allow the applications to share and access common data.

In one embodiment, one or more of the disclosed applications may be hosted on distinct virtual machines, a single virtual machine, or the like. In one example, the confidence module 190 may operate on a machine executing one or more of the applications disclosed. In another example, the confidence module 190 may execute on a distinct computing device and may communicate with the various assets to determine confidence indexes. The confidence module 190 may communicate with any or all of the applications disclosed in FIG. 2.

In an alternative embodiment, a search engine module may represent an interface to a search engine implemented as an external component or module, for example, as part of publication system 120, or as a separate external module. In such a scenario, the search engine module may simply receive the set of item listings that satisfy a search query.

The publication system 120 is shown to include at least one or more auction application(s) 212 which may support auction-format listing and price setting mechanisms (e.g., English, Dutch, Vickrey, Chinese, Double, Reverse auctions etc.). The auction application(s) 212 may also provide a number of features in support of such auction-format listings, such as a reserve price feature whereby a seller may specify a reserve price in connection with a listing and a proxy-bidding feature whereby a bidder may invoke automated proxy bidding. The auction-format offer in any format may be published in any virtual or physical marketplace medium and may be considered the point of sale for the commerce transaction between a seller and a buyer (or two users).

One or more fixed-price application(s) 214 support fixed-price listing formats (e.g., the traditional classified advertisement-type listing or a catalogue listing) and buyout-type listings. Specifically, buyout-type listings (e.g., including the Buy-It-Now® (BIN) technology developed by eBay Inc., of San Jose, California) may be offered in conjunction with auction-format listings, and allow a buyer to purchase goods or services, which are also being offered for sale via an auction, for a fixed-price that may be typically higher than the starting price of the auction.

The application(s) of the application server(s) 118 may include one or more store application(s) 216 that allow a seller to group listings within a "virtual" store. The virtual store may be branded and otherwise personalized by and for the seller. Such a virtual store may also offer promotions, incentives and features that are specific and personalized to a relevant seller.

Navigation of the online marketplace may be facilitated by one or more navigation application(s) 220. For example, a search application (as an example of a navigation application) may enable key word searches of listings published via the network-based publisher 102. A browse application may allow users to browse various category, catalogue, or inventory data structures according to which listings may be classified within the network-based publisher 102. Various other navigation applications may be provided to supplement the search and browsing applications.

Merchandizing application(s) 222 may support various merchandising functions that may be made available to sellers to enable sellers to increase sales via the network-based publisher 102. The merchandizing application(s) 222 may also operate the various merchandising features that may be invoked by sellers, and may monitor and track the success of merchandising strategies employed by sellers.

Personalization application(s) 230 may allow users of the network-based publisher 102 to personalize various aspects of their interactions with the network-based publisher 102. For example, a user may, utilizing an appropriate personalization application 230, create a personalized reference page at which information regarding transactions to which the user may be (or has been) a party may be viewed. Further, the personalization application(s) 230 may enable a third party to personalize products and other aspects of their interactions with the network-based publisher 102 and other parties, or to provide other information, such as relevant information about themselves.

The publication system 120 may include one or more internationalization application(s) 232. In one embodiment, the network-based publisher 102 may support a number of marketplaces that are customized, for example, for specific geographic regions. A version of the network-based publisher 102 may be customized for the United Kingdom, whereas another version of the network-based publisher 102 may be customized for the United States. Each of these versions may operate as an independent marketplace, or may be customized (or internationalized) presentations of a common underlying marketplace. The network-based publisher 102 may accordingly include a number of internationalization application(s) 232 that customize information (and/or the presentation of information) by the network-based publisher 102 according to predetermined criteria (e.g., geographic, demographic or marketplace criteria). For example, the internationalization application(s) 232 may be used to support the customization of information for a number of regional websites that are operated by the network-based publisher 102 and that are accessible via respective web servers.

Reputation application(s) 234 allow users that transact, utilizing the network-based publisher 102, to establish, build and maintain reputations, which may be made available and published to potential trading partners. Consider that where, for example, the network-based publisher 102 supports person-to-person trading, users may otherwise have no history or other reference information whereby the trustworthiness and credibility of potential trading partners may be assessed. The reputation application(s) 234 allow a user, for example through feedback provided by other transaction partners, to establish a reputation within the network-based publisher 102 over time. Other potential trading partners may then reference such a reputation for the purposes of assessing credibility and trustworthiness.

In order to make listings available via the network-based publisher 102 as visually informing and attractive as possible, the publication system 120 may include one or more imaging application(s) 236 utilizing which users may upload images for inclusion within listings. An imaging application 236 also operates to incorporate images within viewed listings. The imaging application(s) 236 may also support one or more promotional features, such as image galleries that are presented to potential buyers. For example, sellers may generally pay an additional fee to have an image included within a gallery of images for promoted items.

The publication system 120 may include one or more offer creation application(s) 238. The offer creation application(s) 238 allow sellers conveniently to author products pertaining to goods or services that they wish to transact via the network-based publisher 102. Offer management application(s) 240 may allow sellers to manage offers, such as goods, services, or donation opportunities. Specifically, where a particular seller has authored and/or published a large number of products, the management of such products may present a challenge. The offer management application(s) 240 provide a number of features (e.g., autoreproduct, inventory level monitors, etc.) to assist the seller in managing such products. One or more post-offer management application(s) 242 also assist sellers with a number of activities that typically occur post-offer. For example, upon completion of an auction facilitated by one or more auction application(s) 212, a seller may wish to leave feedback regarding a particular buyer. To this end, a post-offer management application 242 may provide an interface to one or more reputation application(s) 234, so as to allow the seller conveniently to provide feedback regarding multiple buyers to the reputation application(s) 234.

The dispute resolution application(s) 246 may provide mechanisms whereby disputes arising between transacting parties may be resolved. For example, the dispute resolution application(s) 246 may provide guided procedures whereby the parties are guided through a number of steps in an attempt to settle a dispute. In the event that the dispute cannot be settled via the guided procedures, the dispute may be escalated to a mediator or arbitrator.

The fraud prevention application(s) 248 may implement various fraud detection and prevention mechanisms to reduce the occurrence of fraud within the network-based publisher 102. The fraud prevention application(s) 248 may prevent fraud with respect to the third party and/or the client user in relation to any part of the request, payment, information flows and/or request fulfillment. Fraud may occur with respect to unauthorized use of financial instruments, non-delivery of goods, and abuse of personal information.

Authentication application(s) 250 may verify the identity of a user, and may be used in conjunction with the fraud prevention application(s) 248. The user may be requested to submit verification of identity, an identifier upon making the purchase request, for example. Verification may be made by a code entered by the user, a cookie retrieved from the device, a phone number/identification pair, a username/password pair, handwriting, and/or biometric methods, such as voice data, face data, iris data, finger print data, and hand data. In some embodiments, the user may not be permitted to login without appropriate authentication. The system 100 may automatically recognize the user, based upon the particular network-based device used and a retrieved cookie, for example.

The network-based publisher 102 itself, or one or more parties that transact via the network-based publisher 102, may operate loyalty programs and other types of promotions that are supported by one or more loyalty/promotions application(s) 254. For example, a buyer/client user may earn loyalty or promotions points for each transaction established and/or concluded with a particular seller/third party, and may be offered a reward for which accumulated loyalty points can be redeemed.

The application server(s) 118 may include messaging application(s) 256. The messaging application(s) 256 are responsible for the generation and delivery of messages to client users and third parties of the network-based publisher 102. Information in these messages may be pertinent to services offered by, and activities performed via, the publication system 120. Such messages, for example, advise client users regarding the status of products (e.g., providing "out of stock" or "outbid" notices to client users) or payment status (e.g., providing invoice for payment, Notification of a Payment Received, delivery status, invoice notices). Third parties may be notified of a product order, payment confirmation and/or shipment information. Respective messaging application(s) 256 may utilize any one of a number of message delivery networks and platforms to deliver messages to users. For example, messaging application(s) 256 may deliver electronic mail (e-mail), instant message (IM), Short Message Service (SMS), text, facsimile, or voice (e.g., Voice over IP (VOIP)) messages via the wired (e.g., the Internet), Plain Old Telephone Service (POTS), or wireless (e.g., mobile, cellular, WiFi, WiMAX) networks.

The payment system 122 may include one or more payment processing application(s) 258. The payment processing application(s) 258 may receive electronic invoices from the merchants and may receive payments associated with the electronic invoices. The payment system 122 may also make use of functions performed by some applications included in the publication system 120.

The publication system 120 may include one or more data confidence index applications 260. The confidence module 190 may be included in any or all of the data confidence index applications 260. The one or more data confidence index applications 260 may include information comprising instructions for performing the methods discussed in detail below. In one embodiment, data regarding the existence of an asset may be recorded and placed in a database such as database(s) 126 of FIG. 1. In one example, the data for the existence of an asset may be collected by a person auditing or electronically scanning assets and electronically inputting data indicating whether the asset is actually present. In another example, data regarding the state of an asset may be recorded in the database, as discussed in more detail below.

Database Structure

Figure 3:
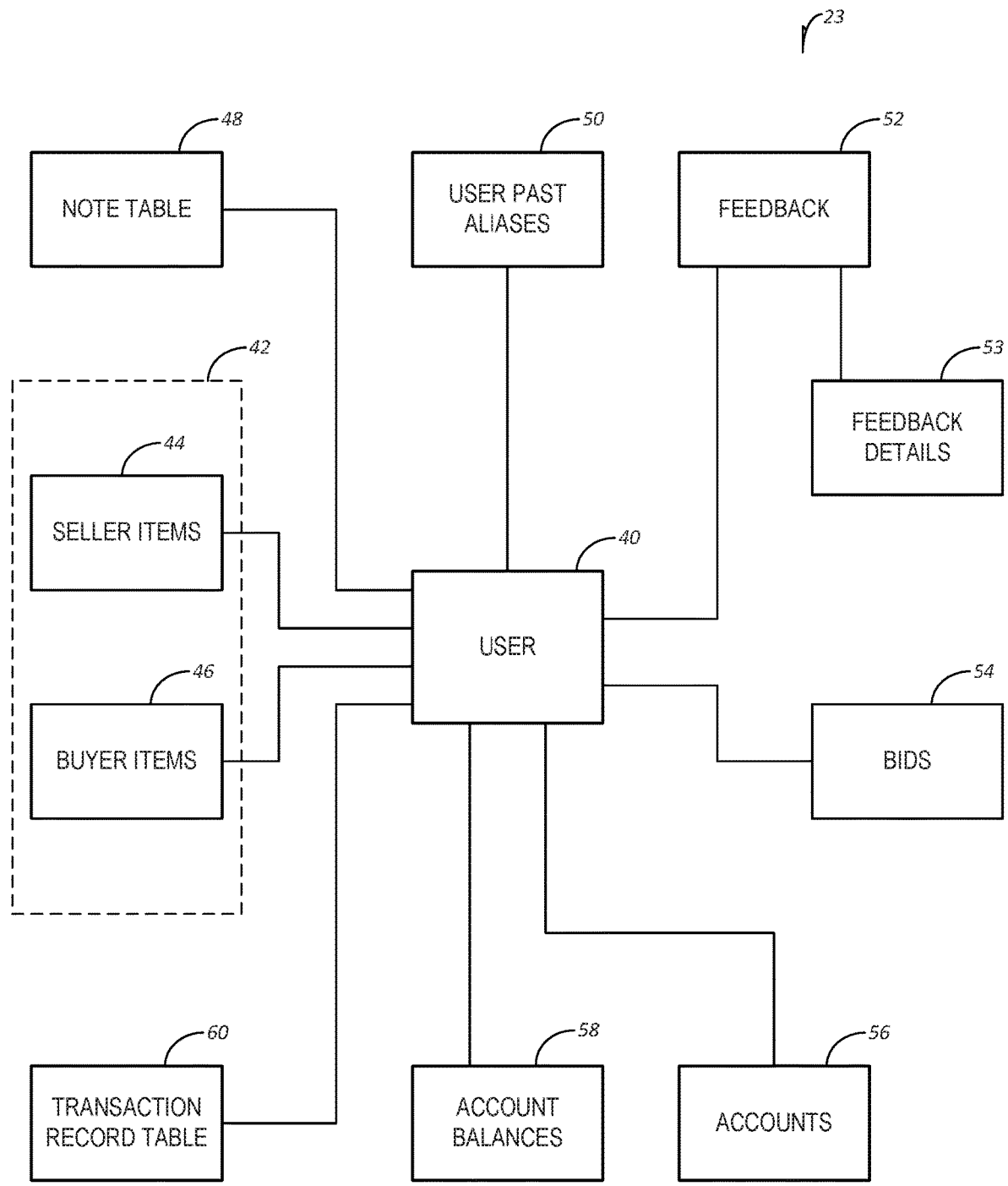
FIG. 3 is a block diagram illustrating an exemplary database, maintained by and accessed via a database engine server, according to example embodiments.

FIG. 3 is a database diagram illustrating an exemplary database 126 (FIG. 1), maintained by and accessed via the database engine server 124, which at least partially implements and supports the publication system 120. This may be usable, for example, when the publication system 120 comprises systems such as an ecommerce system. The database 126 may, in one embodiment, be implemented as a relational database, and include a number of tables having entries, or records, that are linked by indices and keys. In an alternative embodiment, the database 126 may be implemented as a collection of blocks in a block-oriented database. While FIG. 3 shows one embodiment of a database, it will be appreciated by those skilled in the art that the inventive subject matter can be used with other database structures.

Central to the database 126 is a user table 40, which may contain a record for each user of the publication system 120. A user may operate as a seller, buyer, or both, within publication system 120. The database 126 may also include item tables 42 that may be linked to the user table 40. Specifically, the item tables 42 may include a seller items table 44 and a buyer items table 46. A user record in the user table 40 may be linked to multiple items that are being, or have been, auctioned or otherwise marketed via the publication system 120. A link indicates whether the user is a seller or a buyer with respect to items for which records exist within the item tables 42. While offerings by the seller are referred to as "items" in the specification, "items" includes any product or service offered by the seller. The database 126 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned or otherwise sold via the publication system 120 or to a user of the publication system 120.

A number of other tables are also shown to be linked to the user table 40, namely a user past aliases table 50, a feedback table 52, a bids table 54, an accounts table 56, an account balances table 58, and a transaction record table 60.

The publication system 120 includes a user interface which may the browser, referred to in FIG. 1 as a web client 106. For an example in which the publication system 120 comprises an ecommerce system, a user can, using the web client 106, enter or select a search term describing an item the user is interested in seeing for possible purchase. Usually a user, such as a buyer, buyer would like to browse a category of images, for example hand bags, by style and/or brand so that the buyer can quickly find something interesting to the buyer. The buyer selects one of the choices for the desired item, and images of one or more of the category of item selected from the choices are returned for the buyer to consider for possible purchase. For instance, a number of product types can be presented via the user interface by name, such as shoes, handbags, clothes, and the like. If the category of item the buyer desires is a handbag, the handbag selection presented to the buyer in textual form by the user interface might be the words "clutch," "evening bag," "messenger style," and "satchel," among others. An example of general ways for a buyer to find products is seen in U.S. patent application Ser. No. 11/618,503, filed on Dec. 29, 2006, and incorporated herein by reference in its entirety.

In response to the selection of items, information, including images and attributes of the selected items, can then be returned to the user interface for the user. In one embodiment this is accomplished by the system 100 mapping the selected evening bag image information of this example to a textual value and making a query to the publication system 120, which will undertake a search using the query and will then obtain and return the foregoing image and attributes. In another embodiment, attributes of the images can be returned separately for presentation to the user by way of the user interface.

In some embodiments, when a user operates the web client 106 on a client device 110 to interact with the publication system 120, the user may be presented with a search interface on web client 106, with items from which the user can select an item to be used in generating a search request submitted to the publication system 120. In some embodiments users themselves may be able to select certain item attributes. For example, the buyer may be interested in women's shoes. The buyer selects a category of shoe, and, as a result, shoes of that category, with certain attributes, such as the color, fabric, size, price, and the like, will be returned for the user to see and possibly purchase. This can be implemented by the publication system 120, after receiving and processing the search request, communicating a response to the web client 106. The response could be, for example, an Internet document or web page that, when rendered by the web client 106, displays a search results page showing one or more item listings, possibly with attributes, that satisfy the user's search request. The item listings are, in some embodiments, presented by a presentation module, which may be a web server or an application server.

In some embodiments, a search engine module, not shown but of a type well known in the industry, could provide the actual search function. For instance, the search engine module, in some embodiments, receives and processes a search request to identify the item listings that satisfy the search request. It will be appreciated by those skilled in the art that a variety of search techniques might be implemented to identify item listings that satisfy a search request. In general, however, the item attributes of item listings are analyzed for the presence of the user-provided search terms.

Market Place Example

One example of a publication system (e.g., publication system 120) might be an electronic market place such as an ecommerce system. An ecommerce system, like many other publication systems, may have an immense number of assets, such as, for example, servers. Each asset or server may have a data record in, for example, a data structure in a database such as database(s) 126 of FIG. 1. If data relative to servers in existence, or their operative condition, or state, is incorrect, a user for the system may receive incorrect data as to the number of servers actually available and/or their operative state. In one example, this may lead to purchasing unneeded servers if data that shows that more servers are needed is incorrect. In another example, incorrect data regarding available servers may lead to not purchasing a sufficient number of servers if the data shows the existence of more servers than are actually in existence for a data center.

Therefore, a user may want to determine confidence in data relating to the existence of a server that is indicated by record to be in or associated with a data center. In one example, in response to a specific asset being associated with a specific data center, the confidence module 190 may increase a confidence index for the asset. In another example, in response to a specific asset not being associated with any data center, the confidence module 190 may decrease a confidence index for the asset. In another example, a set of database servers may serve queries from a user of the marketplace system. In response to a decline in confidence indexes for one or more of the database servers (e.g., database server(s) 124), the confidence module 190 may determine that additional database servers should be acquired as backup servers and/or replacement servers.

In some instances a user may want to determine confidence in data relating to the state of a given server. In one example, a user may desire knowing if a specific server is currently in operation. The confidence module 190 may apply a set of rules for the server and may return a confidence index to the user. In one example, although 10 database servers may be allocated to provide requested data, one or more of the database servers may have changed a state from "warm cache" to "EOL." Therefore, although all of the 10 database servers may be online, the confidence module 190 may discard data from a server in an "EOL" state and request similar data from another of the 10 servers.

FIG. 4 is a diagram illustrating a concept of data confidence, according to an example embodiment. Two instances of confidence indexes are illustrated. In one example, the confidence index 420 may indicate the existence of the asset. Listed under Existence Confidence in FIG. 4 are various rules for determining a confidence index 420. As indicated, the confidence index 420 of the existence data may be calculated by setting the confidence index 420 to illustrate percentages based on rules discussed below. In certain examples, the confidence module 190 may assume an initial confidence index 420 and may then adjust the confidence index 420 in response to results of applying the rules.

Figure 3A:
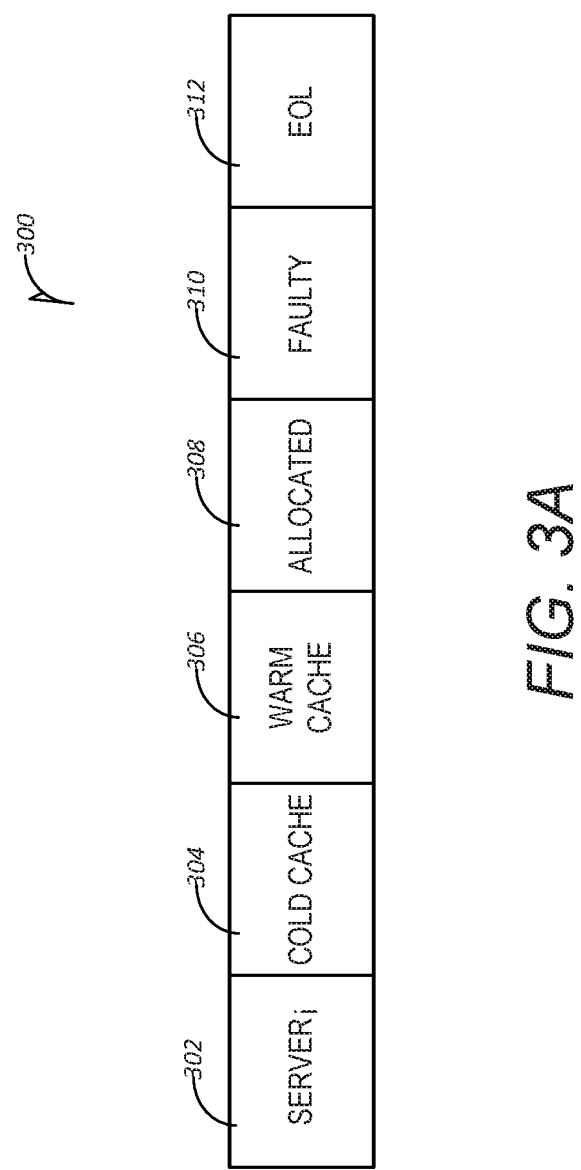
FIG. 3A is an illustration of a data structure in an exemplary database, according to an example embodiment.

FIG. 4 also illustrates a confidence index 440 including state confidence, in this case the asset being a server and the state of the asset being cold cache, discussed in more detail below. Turning for a moment to FIG. 3A, it is seen that in one embodiment, a given asset, SERVER 302*i*, may have five states, seen in one example embodiment as five data fields (reference numbers 304-312) in a data structure 300. In one example, each data field (304-312) may include a flag to indicate whether the server 302 is in that state. In another example, a data field may include a single value to indicate the state. Of course, one skilled in the art may recognize other ways in which a state indicator may be stored in a field of data. In one example, the data fields are Cold Cache 304, Warm Cache 306, Allocated 308, Faulty 310, and EOL (i.e., End of Life) 312. These may be given the following designations:

Cold Cache 304: The state in which an asset is in the process of being placed into condition to be registered with a cloud platform.

Warm Cache 306: The asset is registered with a cloud platform and is ready for use by the cloud platform.

Allocated 308: The asset is provisioned with an operating system and is in service to an application or function in a data center.

Faulty 310: The asset is in a faulty condition.

EOL 312: The asset is at the end of its life, may have been decommissioned, and may have been moved away.

In one embodiment, the database(s) 126 may store confidence indexes associated with different states. For example, the confidence module 190 may determine an existence confidence index for the asset, a cold cache confidence index for the asset, a warm cache confidence index for the asset, an allocated confidence index for the asset, a faulty confidence index for the asset, an end-of-life confidence index for the asset, or other confidence index, or the like.

In another embodiment, the confidence module 190 may alter a state for an asset in response to determining a state with the highest confidence index. In one example, the confidence module 190 may determine a "cold cache" confidence index to be 70% and a "warm cache" confidence index to be 90%. In response, the confidence module 190 may change a state for the asset to "warm cache."

The confidence that the data within each data field is correct may be assessed based on actions in accordance with rules discussed below. Stated another way, the data in a given data field is correlated with the rules and then a confidence index is given based on the correlation. As an example, there may be a stockroom in a data center. If a server is moved into the stock room, typically what an asset management team may do is to record, in a data field in a data structure that reflects the state of the server, that the server is in stock or that it is now in a stock stage. Then, if the server is moved out of stock and it into its final position in the data center, the server data may be changed to indicate that the server has moved into a rack state. The confidence module 190 may adjust the confidence index based on these changes.

As an asset, here a server, goes through one state and another, its state, for example its data field in FIG. 3A, changes in the database. Stated another way, changing the server's state from one data field to another in FIG. 3A, indicates that a state change happens on the asset, indicating that somebody is actually doing something with that asset. Therefore, the probability that the asset actually exists in the data center is high because the server is actually being worked on. Therefore, in certain embodiments, the confidence module 190 may determine a confidence index based, at least in part, on state changes for the asset.

Detecting a predetermined action with respect to an asset may comprise detection of an action that comprises a rule that applies to the asset. This information may also be used to adjust the confidence that one may have in the data that the asset is in a given state.

Returning now to the description of FIG. 4, the confidence in data indicating that the server is in cold cache state may be set at various indexes depending on steps undertaken with respect to the server. For example, if the server has been audited and found to be in the cold cache state within the past year, the confidence module 190 may set the confidence index to 100%, the rule in this example being that an audit within a year yields very high confidence that the server is in cold cache state as indicated in the data structure 300 of FIG. 3A. Examples of low confidence that the server is in cold cache state may be that the asset has node servers or has an operating system (OS) installed, because the rule may be that assets in the cold cache state do not have an OS installed, nor does an asset have a node server on it if the asset is in cold cache.

Further, assuming that the part of the ecommerce publication system under discussion is a marketplace (MP) function, if the asset is a non-MP resource, confidence that it is in cold cache state for the MP function is zero. Each of the foregoing examples of low confidence is an example of a violation of a rule. A rule may be that an operating system may not be installed on a server in cold cache state, and a server that is indicated as being in cold cache state having an operating system installed is a violation of the rule. A rule may be that an asset may not have a node server on it in cold cache state, and an asset indicated as being in a cold cache state that is found to have a node server is a violation of the rule. A rule may be that a server is for an MP function, and if a server indicated as being in a cold cache state is found to be marked as a non-MP resource, this may be a violation of a rule for the MP function. In one example, the server may be allocated for security or authentication purposes of the MP. In this case, because the server is primarily responsible for function that does not include MP data, data provided by the server relating to MP functions may not be relied on. Violation of a rule for a given state therefore indicates low confidence in data which indicates that an asset is in that given state. A low confidence that data indicating an asset is in a given state, or low confidence in existence data, may be called to the attention of an administrator for investigation of the state of the asset and resolution of any mis-indication of the state or existence of the asset.

Server Data Confidence Example

The confidence measurement approach, or algorithm, may be used to give a quantitatively expressed reduction of uncertainty based on one or more observations. Other available data sources may be cross-sourced, and give confidence indexes to the trust level and relevance of a data source.

In one example, the confidence module 190 may communicate with a network manager and/or a network tracking database (NetDB). An application such as NetDB may monitor devices communicating on the network and may report on device communication activities. Therefore, in certain examples, the confidence module 190 may communicate with a network tracking database to determine connectivity with a network.

In another example, the confidence module 190 may communicate with a remote database to determine whether an asset is in a disposed state. For example, a remote database may store database records regarding an asset's intended use. In response to an intended use for the asset including information that the asset is to be disposed of, the confidence module 190 may decrease the confidence index for the asset.

In one example of a set of rules, the rules may be:
Initialize the confidence to be 0
Set to 100% if asset has communicated on the network within last 30 days
Set to 90% if asset has communicated on the network within last 60 days
Set to 80% if asset has communicated on the network within last 90 days
Set to 70% if asset has communicated on the network within last 180 days
Set to 90% if asset had been physically scanned within last 1 year
Set to 80% if asset had been physically scanned within last 2 years
Set to 70% if assets had been physically scanned within last 3 years
Set to 50% if asset is included in a database record (not in disposed status)
Boost 50% if non-disposed asset is managed by a network manager
Boot 40% if non-disposed asset status changed within 90 days
Boost 30% if non-disposed asset status changed within 1 year
Boost 20% if non-disposed asset status changed within 2 year
Boost 10% if non-disposed asset status changed within 3 year
Detract 50% if asset is not associated with a specific data center
Detract 50% if asset has unknown manufacturer
Detract 50% if asset has unknown model number
Detract 50% if asset manufacturer indicates it is not a server
Limit the resultant value to a maximum value of 100 and a minimum value of 0.

Terms such as NetDB may mean a database to store network data, and ODB may mean a database to store cloud operation and infrastructure data as one skilled in the art may appreciate. Additional examples for asset state confidence are seen below.

In certain examples, a rule may include a name, precondition, assertion, and action. A name includes a text string, or other information, to identify the rule to a human reader.

Providing a name for a rule may simplify understanding of the rule by a user. A precondition for a given rule may include a condition that must be met before the rule may be applied. In one example, the system 100 may wait for the associated precondition to be met before applying the rule, but, of course, this is not necessarily the case. A rule may or may not include a rule precondition. In some examples, the confidence module 190 will not apply the rule in response to the rule precondition not being met. An assertion for the rule includes a logical test to apply to the asset. In response to the logical testing being true, the confidence module 190 may adjust the confidence index as specified in the action for the rule. The following tables illustrate various examples of a set of rules to determine a confidence index for an asset.

| | | Cold Cache State | | |
|---|---|---|---|---|
| Order | Name | Preconditions | Assertions | Action |
| 1 | Start with 50 | | | confidence = 50 |
| 2 | Set to 100% if asset last audit within one year | confidence < 100 | [asset last audit date within 1 year] == true | confidence = 100 |
| 3 | Set to 90% if asset status is changed within last 1 year | confidence < 90 | [asset status changed within 1 year] == true | confidence = 90 |
| 4 | Set to 60% if asset status is changed within last 2 years | confidence < 60 | [asset status changed within 1 year] == false && [asset status changed within 2 year] == true | confidence = 60 |
| 5 | Set to 10% if the asset has node servers | confidence > 10 | [asset has node servers] == true | confidence = 10 |
| 6 | Set to 10% if asset has mini OS or OS installed | confidence > 10 | [asset Non-ILOM mac netdb last update within 30 days] == true | confidence = 10 |
| 7 | Set to 0% if the asset is non MP Reserved Resources. | confidence > 0 | [asset RR label is Non-MP Compute Assets] == true | confidence = 0 |

| | | Warm Cache State | | |
|---|---|---|---|---|
| Order | Name | Preconditions | Assertions | Action |
| 1 | Start confidence index to be 50 | | | confidence = 50 |
| 2 | Set to 100% if asset is managed by stratus | confidence < 100 | [asset is managed by stratus] == true | confidence = 100 |
| 3 | Set to 10% if the asset has node server | confidence > 10 | [asset has node servers] == true | confidence = 10 |
| 4 | Set to 0% if the asset is non MP Reserved Resources | confidence > 0 | [asset RR label is Non-MP Compute Assets] == true | confidence = 0 |

| | | Allocated State | | |
|---|---|---|---|---|
| Order | Name | Preconditions | Assertions | Action |
| 1 | start with 50 | | | confidence = 50 |
| 2 | Set to 100% if the asset is associated with a non MP Reserved Resources Object | confidence < 100 | [asset RR label is Non-MP Compute Assets] == true | confidence = 100 |
| 3 | Set to 90% if the asset has OS installed | confidence < 90 | [asset has node servers] == true && [asset node server netdb | confidence = 90 |

Allocated State

| Order | Name | Preconditions | Assertions | Action |
|---|---|---|---|---|
| 4 | Set to 10% if the asset node server does not have DNS entry | confidence < 100 | last update within last 30 days] == true [asset node server has DNS entries] == false | confidence = 10 |

Figure 5:
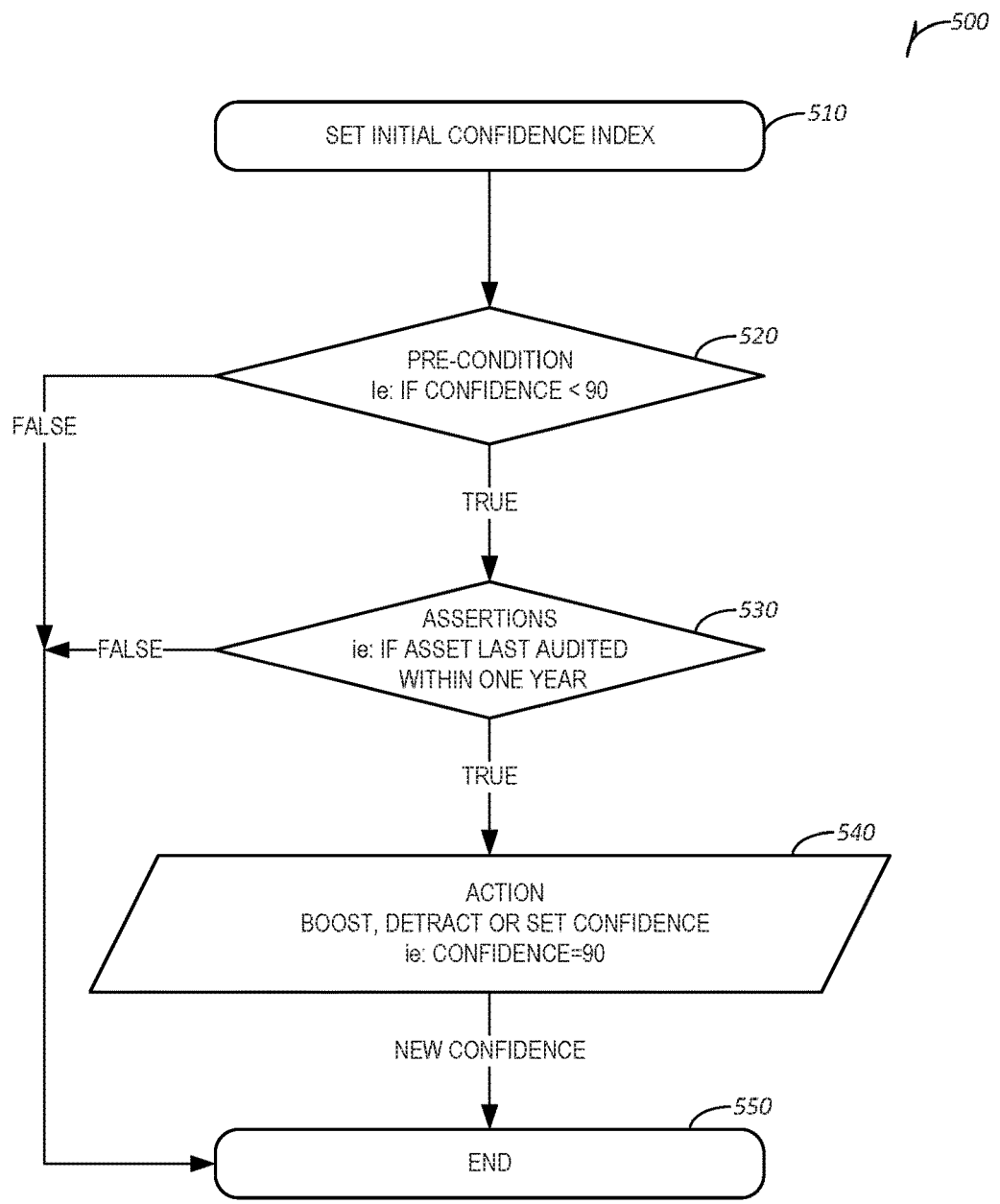
FIG. 5 is a flowchart illustrating a method according to an example embodiment.

FIG. 5 is a flowchart of a method 500 for building a confidence index. The method 500 begins at operation 510 where the confidence module 190 may set an initial confidence. The initial confidence may be set in a state field, such as one of the fields of FIG. 3A. The confidence module 190 may then, at operation 520, determine whether a precondition is true. If the precondition, for example, that the confidence less than 90%, is true, the method 500 advances to step 530, where assertions are tested. In this example embodiment, the assertion is that the asset was last audited within one year. If the answer is true, an action is taken at operation 540 to boost, or detract, or set, confidence. For example confidence=90%. If either test performed at operation 520 or 530 is false, the method 500 advances to operation 550, where the method 500 may end Those of ordinary skill in the art will understand that the above method 500 may be run at any frequency, for example once a day, or in accordance with other time periods.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as may be known by a skilled artisan) as a module that operates to perform certain operations described herein.

In various embodiments, a module may be implemented mechanically or electronically. For example, a module may comprise dedicated circuitry or logic that may be permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that may be temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that may be physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it may be communicatively coupled. A further module may then, at a later time, access the memory device to retrieve and process the stored output. Modules may also initiate communications with input or output devices and can operate on a resource (e.g., a collection of information).

Example Machine Architecture and
Machine-Readable Storage Medium

Figure 6:
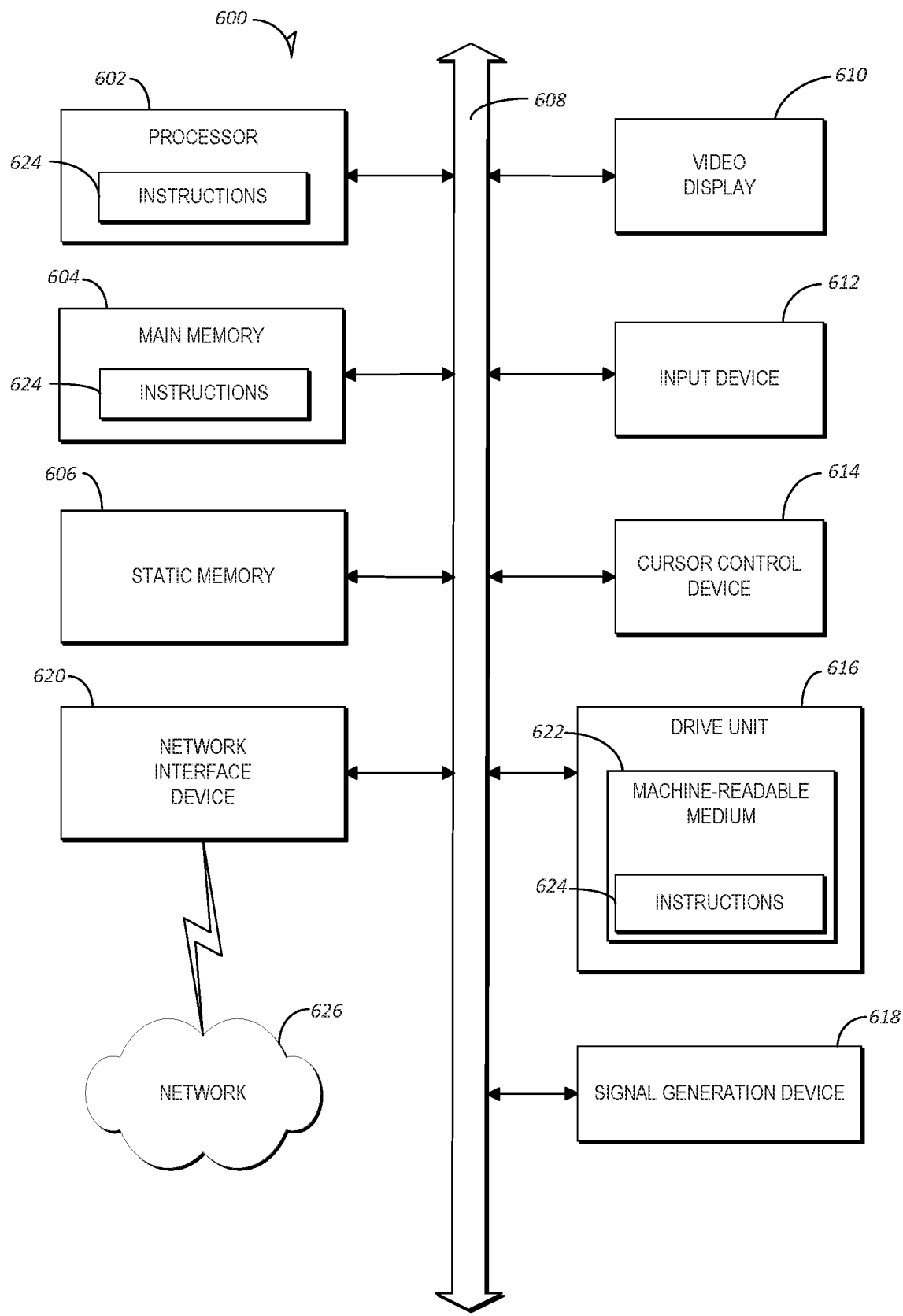
FIG. 6 is a block diagram of an example machine on which components of various embodiments of the system may be executed.

With reference to FIG. 6, an example embodiment extends to a machine in the example form of a computer system 600 within which instructions 624 for causing the machine to perform any one or more of the methodologies discussed herein may be executed. In one example, the confidence module 190 may include executable code executed via the processor 602. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine may be illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

In one embodiment, the processor 602 may execute functions of the confidence module 190 as described herein. Any or each of the main memory 604, the static memory 606, and the drive unit 616 may store executable code for executing functions of the confidence module 190. Furthermore, the confidence module 190 may store determined data in the static memory 606 and/or the drive unit 616. For example, the confidence module 190 may store determined confidence values, determined behaviors and/or characteristics of a remote computing asset as described herein.

In another embodiment, the confidence module 190 may communicate with one or more assets of a network of cooperating assets via the network interface device 620. For example, the confidence module 190 may receive network packets from a remote computing device over the network 626. In another embodiment, the confidence module 190 may receive input from a user via the input device 612 and may display images to a user via the video display 610.

Machine-Readable Medium

The disk drive unit 616 includes a machine-readable storage medium 622 on which may be stored one or more sets of instructions 624 and data structures (e.g., software instructions) embodying or used by any one or more of the methodologies or functions described herein. In one example, code portions of the confidence module 190 may be included in the one or more sets of instructions 624. The instructions 624 may also reside, completely or at least partially, within the main memory 604 or within the processor 602 during execution thereof by the computer system 600, with the main memory 604 and the processor 602 also constituting machine-readable media.

While the machine-readable storage medium 622 may be shown in an example embodiment to be a single medium, the term "machine-readable storage medium" may include a single storage medium or multiple storage media (e.g., a centralized or distributed database, or associated caches and servers) that store the one or more instructions 624. The term "machine-readable storage medium" shall also be taken to include any tangible medium that may be capable of storing, encoding, or carrying instructions (e.g., instructions 624) for execution by the machine and that cause the machine to perform any one or more of the methodologies of embodiments of the confidence module 190, or that may be capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 624 may further be transmitted or received over a communications network 626 using a transmission medium via the network interface device 620 and utilizing any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that may be capable of storing, encoding, or carrying instructions for execution by the machine, and includes digital or analog communications signals or other intangible medium to facilitate communication of such software.

Figure 7:
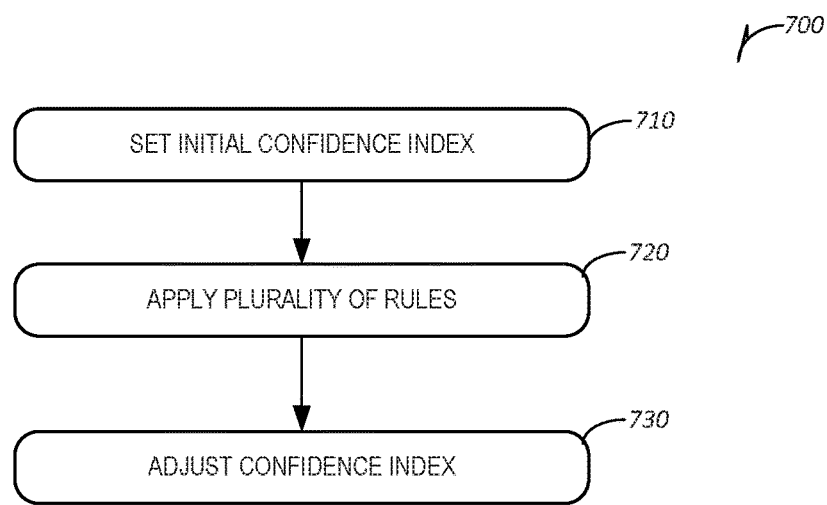
FIG. 7 is a flow chart diagram illustrating one embodiment of a method according to an example embodiment.

FIG. 7 is a flow chart diagram illustrating operations of a machine performing a method 700 according to certain embodiments of the present disclosure. Operations in the method 700 may be performed by the confidence module 190. As shown in FIG. 7, the method 700 includes operations 710, 720, and 730.

In one embodiment, the method 700 may begin and at operation 710 and the client device 110 may set an initial confidence index for a remote computing device. In certain embodiments, the confidence index may indicate trustworthiness of data provided by the remote computing device. In one example, the remote computing device may be an asset in an array of database servers. In another example, the remote computing device may be a web server. Of course, the remote computing device may be any computing device operating in a network of cooperating computing devices. The remote computing device may provide data in response to a request from a client, such as, but not limited to, a web client, a database client, a navigation client, a transaction client, a reputation client, a file server client, a payment processing client, or the like.

The confidence module 190 may then apply, at operation 720, a plurality of ordered rules for the remote computing device. In another embodiment, the rules may include a rule pre-condition and a confidence index adjustment. Respective rules may consider a behavior of the remote computing device and/or a property of the remote computing device.

In one embodiment, a behavior of the remote computing device may include network activity, transmitting network packets on a network transmission medium, an operating status of the remote computing device, or other, or the like. In certain examples, an operating status may include operating as a server, providing one or more network services, being in a specific operating state, operating as a cold cache, operating as warm cache, being allocated for a specific purpose in the network of cooperating devices, being managed by a network resource manager, having an error, being faulty, being flagged for disposal, at end of life, or other behavior, or the like.

In another embodiment, a property of the remote computing device may include date and/or time of a physical scan, having been recorded in an inventory scan, being included in a database record, a change in status within a recent time period, being associated with a data center, missing a manufacturer identifier, missing a model number, being a server, having node servers, having a specific operating system version, type, or other property, or the like. Of course, one skilled in the art may recognize other ways in which a remote computing device may behave or properties a remote computing device may have; this disclosure is meant to include all such ways.

In response to applying the plurality of rules, the confidence module 190 may adjust, at operation 730, the confidence index for the remote computing device responsive to results of applying the plurality of ordered rules. In another embodiment, the confidence module 190 may adjust the confidence index as the respective rules are applied. In one example, the confidence module 190 may apply a first rule, then adjust the confidence index based on an adjustment associated with the first rule. The confidence module 190 may then apply a second rule and adjust the confidence index based on an adjustment associated with the second rule. The confidence module 190 may then apply additional ordered rules and may adjust the confidence index in response to applying the respective rules.

In another embodiment, the confidence module 190 may apply each of the plurality of rules and may or may not apply certain rules as the confidence index is adjusted. For example, where respective rules include a rule precondition that the confidence index be above or below a certain threshold, the confidence module 190 may not apply one or more rules based on the confidence index not satisfying a rule precondition.

Figure 8:
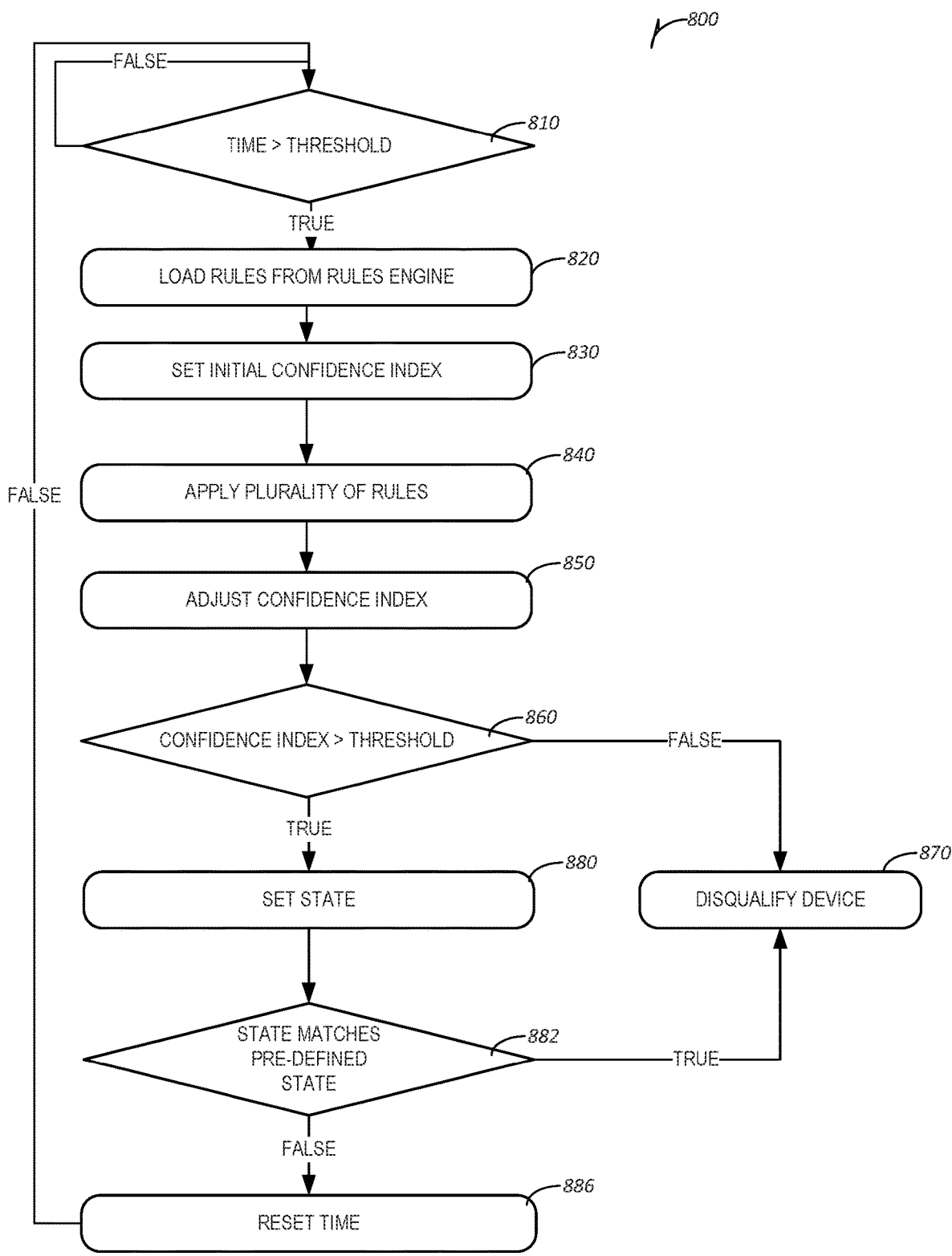
FIG. 8 is a flow chart diagram illustrating a method according to an example embodiment.

FIG. 8 is a flow chart diagram illustrating operations of a machine performing a method 800 according to certain embodiments of the present disclosure. Operations in the method 800 may be performed by the confidence module 190. As shown in FIG. 8, the method 800 includes operations 810, 820, 830, 840, 850, 860, 870, 880, 882, and 886.

In one embodiment, the method 800 may begin and at operation 810 with the confidence module 190 determining if a time threshold has been passed. Delaying beginning the method 800 until the time threshold has passed may result in the method 800 being performed by the confidence module 190 at a predetermined time interval. In one example, the predetermined time interval may be one day. Accordingly, the confidence module 190 may determine a confidence index for remote devices of a network of cooperating assets on a daily basis.

In response to the time threshold not having been passed, the confidence module 190 may again determine, at operation 810, if a time threshold has been passed. In response to the confidence module 190 determining that the time threshold has been passed, the confidence module 190 may continue at operation 820 where the confidence module 190 may load rules from a rules engine as subsequently described.

The confidence module 190 may then set, at operation 830, an initial confidence index. The confidence module 190 may then apply, at operation 840, a plurality of rules to the remote computing device. The confidence module 190 may adjust, at operation 850, the confidence index based, at least in part, on results of applying one or more of the plurality of rules. At operation 860, the confidence module 190 may determine whether the confidence index is above a confidence index threshold. For example, the confidence index threshold may be 30% or about 30%. About 30% may, in certain embodiments, mean that the confidence index threshold may be between 25% and 35%. Of course, this disclosure is not limited in this regard and "about" 30% may include any values that are close to 30% as one skilled in the art may appreciate. In response to the confidence index being at or below the confidence index threshold, the confidence module 190 may, at operation 870, disqualify the remote computing device from participation in the network of cooperating devices. In response, the confidence module 190 may instruct a DNS server to direct network traffic to a backup device, the device may be powered down, or the confidence module 190 may notify a user that repair or replacement of the disqualified device is necessary. In response to the confidence index being above the confidence index threshold, the confidence module 190, at operation 880, may set a state for the remote computing device. In one example, the confidence module 190 may set the state for the remote computing device to "Warm Cache," or other state, as described herein.

In one embodiment, the confidence module 190 may load a set of rules for each available state for the computing device. For example, the confidence module 190 may load a set of rules to determine a confidence index for the "cold cache" state, and a set of rules to determine a confidence index for the "warm cache" state. In response to the set of rules for the "cold cache" state resulting in a confidence index of 70% and a set of rules for the "warm cache" state resulting in a confidence index of 80%, the confidence module 190 may set the state for the computing device to "warm cache." Because the "warm cache" state resulted in a higher confidence index than the "cold cache" state, the computing device may be more likely to operate as a warm cache.

At operation 882, the confidence module 190 may determine whether a state for the remote computing device matches a predefined state. In response to the state matching a predefined state, the confidence module 190 may, at operation 870, disqualify the remote computing device from participation in the network of cooperating devices. In response to the state not matching a predefined state, the confidence module 190 may, at operation 886, reset a time for performing the method 800. The confidence module 190 may then continue at operation 810.

Figure 9:
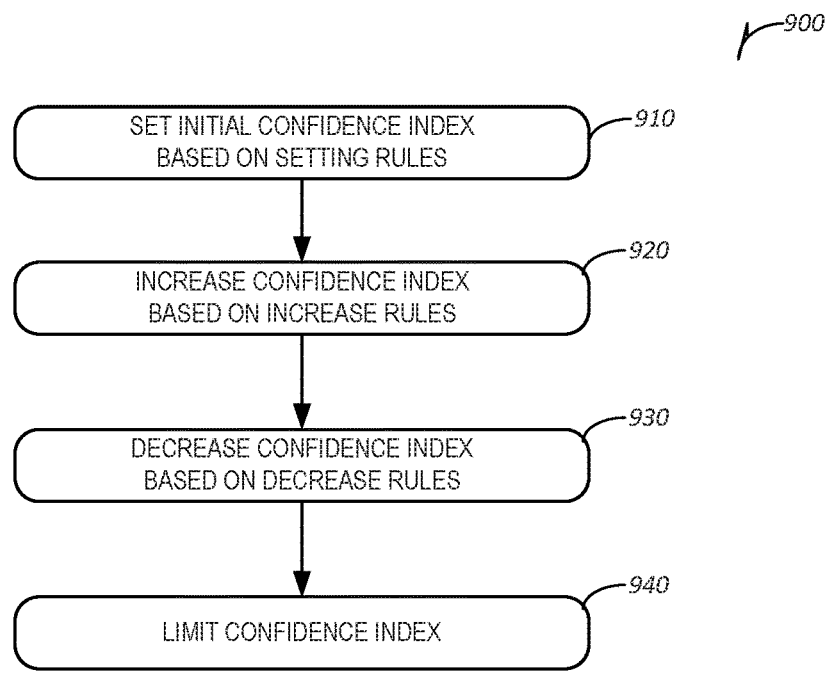
FIG. 9 is a flow chart diagram illustrating a method according to an example embodiment.

FIG. 9 is a flow chart diagram illustrating operations of a machine performing a method 900 according to certain embodiments of the present disclosure. Operations in the method 900 may be performed by the confidence module 190. As shown in FIG. 9, the method 900 includes operations 910, 920, 930, and 940.

In one embodiment, the method 900 may begin and at operation 910 with the confidence module 190 setting an initial confidence index. The confidence module 190 may apply one or more rules to set the initial confidence index. For example, the confidence module 190 may set the confidence index to 90% in response to a physical scan of the remote computing device occurring in the past one year.

The confidence module 190 may then, at operation 920, increase the confidence index based on one or more rules. In one example, the confidence module 190 may increase the confidence index in response to the remote computing device being managed by a network manager.

The confidence module 190 may then, at operation 930, decrease the confidence index based on one or more rules. In one example, the confidence module 190 may decrease the confidence index in response to the remote computing device having an unknown manufacturer or model number. The confidence module 190 may then, at operation 940, limit the confidence index. In one example, the confidence module 190 may set a minimum confidence index to 0 and a maximum confidence index to 100.

Figure 10:
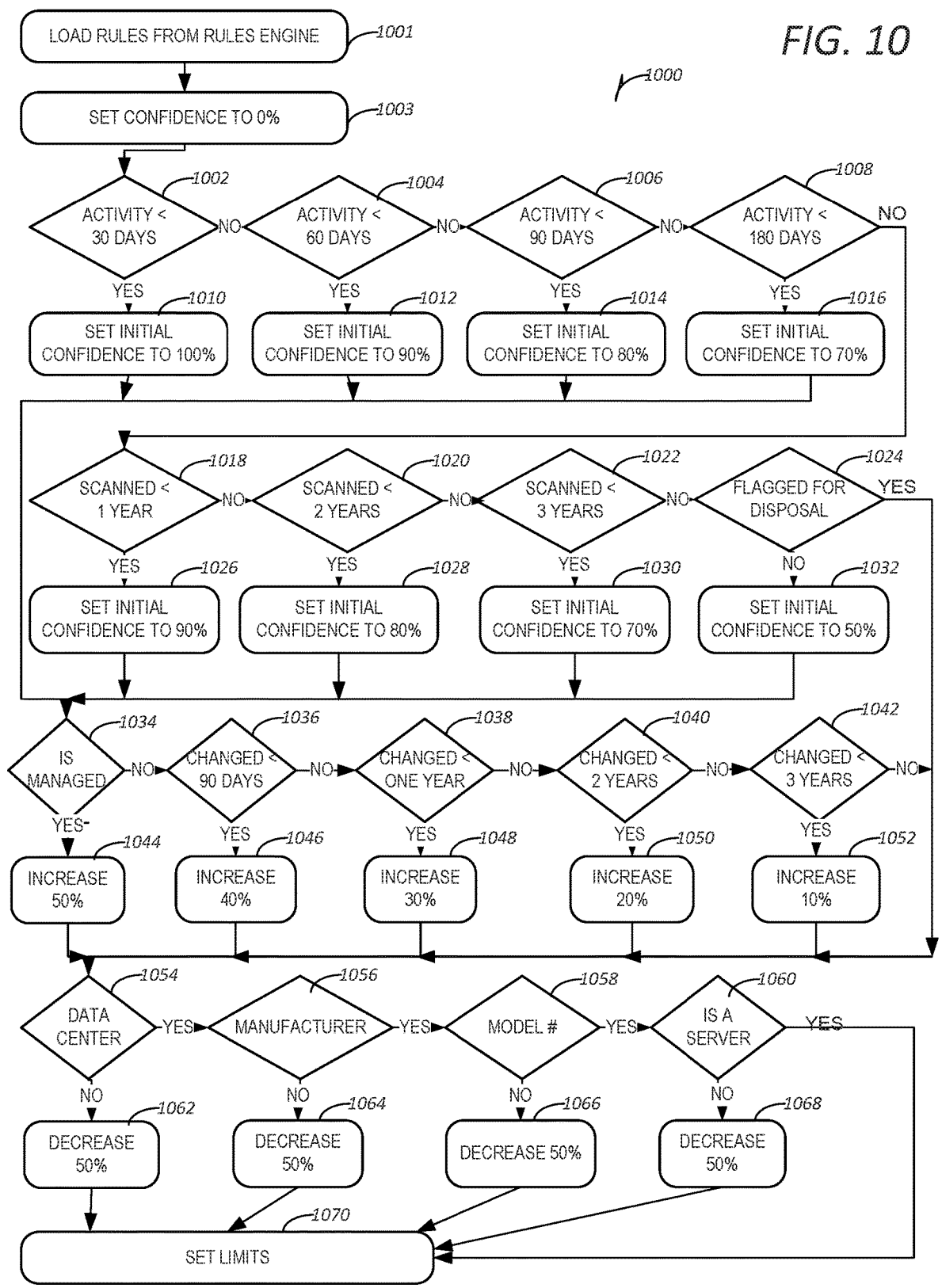
FIG. 10 is a flow chart diagram illustrating a method according to an example embodiment.

FIG. 10 is a flow chart diagram illustrating operations of a machine performing a method 1000 according to certain embodiments of the present disclosure. Operations in the method 1000 may be performed by the confidence module 190. As shows in FIG. 10, the method 1000 includes operations 1001, 1003, 1002, 1004, 1006, 1008, 1010, 1012, 1014, 1016, 1018, 1020, 1022, 1024, 1026, 1028, 1030, 1032, 1034, 1036, 1038, 1040, 1042, 1044, 1046, 1048, 1050, 1052, 1054, 1056, 1058, 1060, 1062, 1064, 1066, 1068, and 1070.

In one embodiment, the method 1000 may begin, and at operation 1001, the confidence module 190 may load one or more rules from a rules engine. Then, the confidence module 190 may, at operation 1003, set the confidence index to 0%. Then, the confidence module 190 may, at operation 1002, determine if the remote computing device has been active on a network in the past 30 days. In response to the confidence module 190 determining that the remote computing device has been active on the network in the past 30 days, the confidence module 190 may continue at operation 1010, where the confidence module 190 may set an initial confidence index at 100%. The confidence module 190 may then continue at operation 1034.

In response to the confidence module 190 determining that the remote computing device has not communicated on the network for the past 30 days, the device may continue at operation 1004, where the confidence module 190 may determine if the remote computing device has been active on a network in the past 60 days. In response to the confidence module 190 determining that the remote computing device has been active on the network in the past 60 days, the confidence module 190 may continue at operation 1012, where the confidence module 190 may set an initial confidence index at 90%. The confidence module 190 may then continue at operation 1034.

In response to the confidence module 190 determining that the remote computing device has not communicated on the network for the past 60 days, the device may continue at operation 1006, where the confidence module 190 may determine if the remote computing device has been active on a network in the past 90 days. In response to the confidence module 190 determining that the remote computing device has been active on the network in the past 90 days, the confidence module 190 may continue at operation 1014, where the confidence module 190 may set an initial confidence index at 80%. The confidence module 190 may then continue at operation 1034.

In response to the confidence module 190 determining that the remote computing device has not communicated on the network for the past 90 days, the device may continue at operation 1008, where the confidence module 190 may determine if the remote computing device has been active on a network in the past about 180 days. In response to the confidence module 190 determining that the remote computing device has been active on the network in the past about 180 days, the confidence module 190 may continue at operation 1016, where the confidence module 190 may set an initial confidence index at about 70%. The confidence module 190 may then continue at operation 1034.

Therefore, in certain embodiments, as a time increases for when the remote computing device has most recently communicated on a network, a resulting confidence index for the remote computing device may similarly decrease.

At operation 1018, the confidence module 190 may then determine whether the remote computing device has been physically scanned in the past one year. In response to the confidence module 190 determining that the remote computing device has been physically scanned in the past one year, the confidence module 190 may continue at operation 1026, where the confidence module 190 may set an initial confidence index at 90%. The confidence module 190 may then continue at operation 1034.

In response to the confidence module 190 determining that the remote computing device has not been physically scanned in the past year, the confidence module 190 may continue at operation 1020. The confidence module 190 may then, at operation 1020, determine whether the remote computing device has been physically scanned in the past two years. In response to the confidence module 190 determining that the remote computing device has been physically scanned in the past two years, the confidence module 190 may continue at operation 1028, where the confidence module 190 may set an initial confidence index at 80%. The confidence module 190 may then continue at operation 1034.

In response to the confidence module 190 determining that the remote computing device has not been physically scanned in the past two years, the confidence module 190 may continue at operation 1022. The confidence module 190 may then, at operation 1022, determine whether the remote computing device has been physically scanned in the past three years. In response to the confidence module 190 determining that the remote computing device has been physically scanned in the past three years, the confidence module 190 may continue at operation 1030, where the confidence module 190 may set an initial confidence index at 70%. The confidence module 190 may then continue at operation 1034.

Therefore, in certain embodiments, as a time increases for when the remote computing device has been physically scanned, an associated confidence index adjustment for the remote computing device may similarly decrease.

In response to the confidence module 190 determining, at operation 1022, that the remote computing device has not been physically scanned in the past three years, the confidence module 190 may continue at operation 1024, where the confidence module 190 may determine whether the remote computing device has been flagged for disposal.

In response to the confidence module 190 determining that the remote computing device has not been flagged for disposal, the confidence module 190 may continue at operation 1032, where the confidence module 190 may set an initial confidence index at 50%. In response to the confidence module 190 determining that the remote computing device has been flagged for disposal, the confidence module 190 may continue at operation 1054.

The operations 1002-1032 represent an example of setting an initial confidence index. Thus, these operations (or some subset thereof) can represent one example embodiment of operations 710, 820, 910, and/or 1112.

Once an initial value is set in operations 1002-1032, the confidence module 190 may then continue at operation 1034 where the confidence module 190 may determine if the remote computing device is managed by a network manager as one skilled in the art may appreciate. In response to determining that the remote computing device is managed by a network manager, the confidence module 190 may continue at operation 1044, where the confidence module 190 may increase the confidence index by 50%.

In response to determining that the remote computing device is not managed by a network manager, the confidence module 190 may continue at operation 1036, where the confidence module 190 may determine whether a state for the remote computing device had changed in the past about 90 days. In response to determining that a state for the remote computing device has changed in the past 90 days, the confidence module 190 may continue at operation 1046, where the confidence module 190 may increase the confidence index by 40%.

In response to determining that a state for the remote computing device has not changed in the past about 90 days, the confidence module 190 may continue at operation 1038, where the confidence module 190 may determine whether a state for the remote computing device has changed in the past about one year. In response to determining that a state for the remote computing device has changed in the past about one year, the confidence module 190 may continue at operation 1048, where the confidence module 190 may increase the confidence index by 30%.

In response to determining that a state for the remote computing device has not changed in the past about one year, the confidence module 190 may continue at operation 1040, where the confidence module 190 may determine whether a state for the remote computing device has changed in the past about two years. In response to determining that a state for the remote computing device has changed in the past about two years, the confidence module 190 may continue at operation 1050, where the confidence module 190 may increase the confidence index by 20%.

In response to determining that a state for the remote computing device has not changed in the past about two years, the confidence module 190 may continue at operation 1042, where the confidence module 190 may determine whether a state for the remote computing device has changed in the past about three years. In response to determining that a state for the remote computing device has changed in the past about three years, the confidence module 190 may continue at operation 1052, where the confidence module 190 may increase the confidence index by 10%.

In response to determining that a state for the remote computing device has not changed in the past about three years, the confidence module 190 may continue at operation 1054, where the confidence module 190 may determine whether the remote computing device is associated with a physical data center. In response to determining that the remote computing device is not associated with a data center, the confidence module 190 may continue at operation 1062, where the confidence module 190 may decrease the confidence index by about 50%.

In response to determining that the remote computing device is associated with a data center, the confidence module 190 may continue at operation 1056, where the confidence module 190 may determine whether the remote computing device includes a manufacturer identifier. In response to determining that the remote computing device does not include a manufacturer identifier, the confidence module 190 may continue at operation 1064, where the confidence module 190 may decrease the confidence index by about 50%.

In response to determining that the remote computing device does include a manufacturer identifier, the confidence module 190 may continue at operation 1058, where the confidence module 190 may determine whether the remote computing device includes a model number. In response to determining that the remote computing device does not include a model number, the confidence module 190 may continue at operation 1066, where the confidence module 190 may decrease the confidence index by about 50%.

In response to determining that the remote computing device does include a model number, the confidence module 190 may continue at operation 1060, where the confidence module 190 may determine whether the remote computing device is a server. In response to determining that the remote computing device is a server, the confidence module 190 may continue at operation 1070, where the confidence module 190 may set a maximum and a minimum value for the confidence index. In response to determining that the remote computing device is not a server, the confidence module 190 may continue at operation 1068, where the confidence module 190 may decrease the confidence index by about 50% and continue at operation 1070.

In certain example embodiments, applying many rules to a remote computing device may result in a confidence index that is either below 0% or above 100%. In one example, at operation 1070, in response to a confidence index being below 0%, the confidence module 190 may raise the confidence index to 0%. In another example, at operation 1070, in response to a confidence index being above 100%, such as for example 120%, the confidence module 190 may lower the confidence index to 100%.

The operations 1002-1008, 1018-1024, 1034-1042 and 1054-1060 represent an example of applying a set of rules to a remote computing device. Thus, these operations (or some subset thereof) may represent one example embodiment of operations 720, 840, and/or 1122. In another example embodiment, operations 1034-1052 represent operation 920. In a further example embodiment, operations 1054-1068 represent operation 930.

Figure 11:
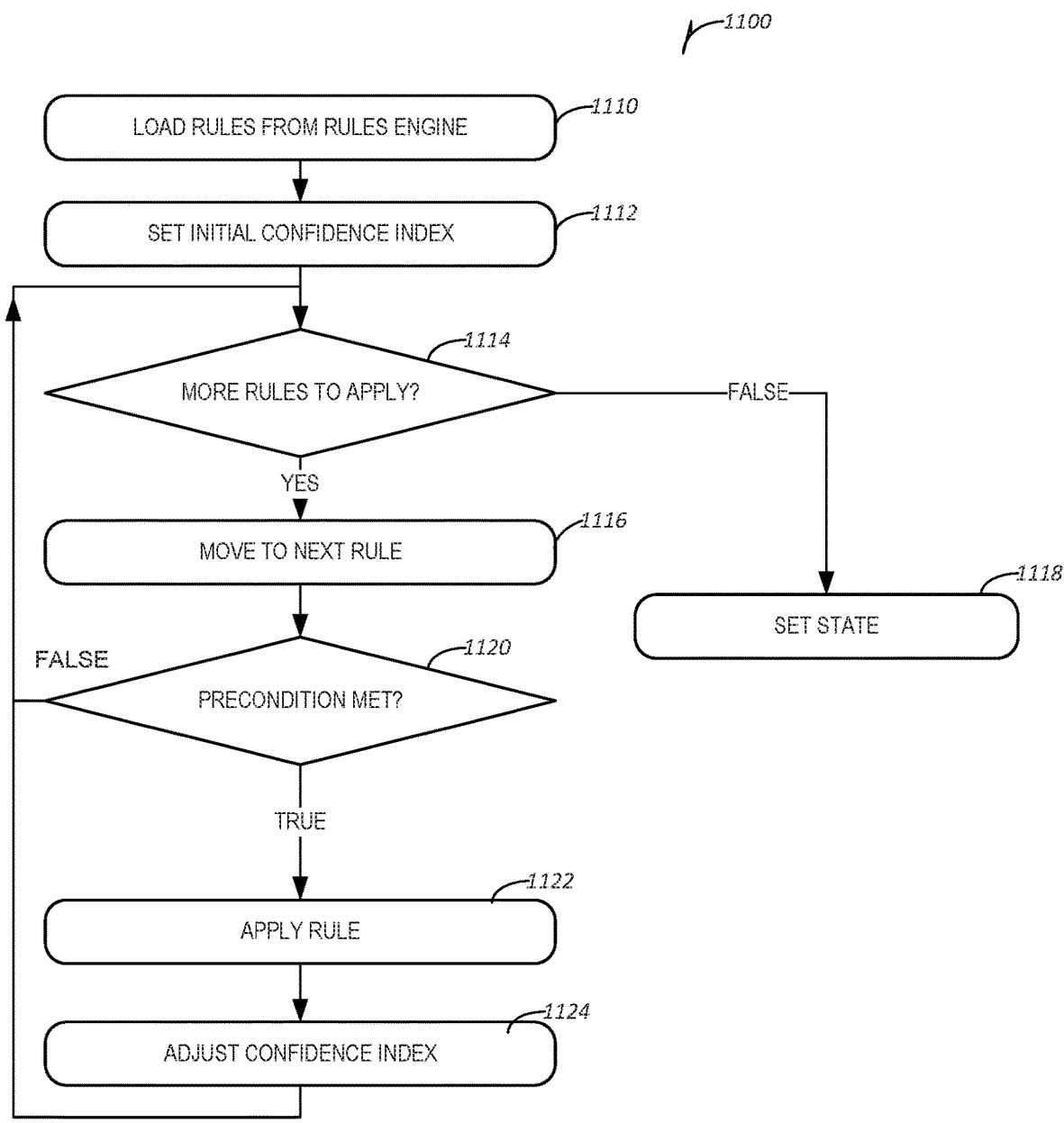
FIG. 11 is a flow chart diagram illustrating a method according to an example embodiment.

FIG. 11 is a flow chart diagram illustrating operations of a machine performing a method 1100 according to certain embodiments of the present disclosure. Operations in the method 1100 may be performed by the confidence module 190. As shown in FIG. 11, the method 100 includes operations 1110, 1112, 1114, 1116, 1118, 1120, 1122, 1124.

In one embodiment, the method 1100 may begin and at operation 1110 the confidence module 190 may load one or more rules from a rules engine. A rules engine, in certain embodiments, may be a computing device that may provide one or more rules upon request. The rules engine may receive rules from a user of the rules engine. The rules engine may order the rules, may prioritize rules, may remove rules, may add rules, may reorder rules, may store sets of rules, or may perform other actions on a set of rules as one skilled in the art may appreciate.

After loading rules from a rules engine, the confidence module 190 may continue at operation 1112, where the confidence module 190 may set an initial confidence index. Then, the confidence module 190 may determine, at operation 1114, whether there are additional rules to apply. In response to there being no additional rules to apply, the confidence module 190 may continue at operation 1118, where the confidence module 190 may set a state for the remote computing device based on results of applying the rules.

In response to there being additional rules to apply, the confidence module 190 may continue at operation 1116, where the confidence module 190 may load a next rule. Then, the confidence module 190 may determine, at operation 1120, whether a precondition for the current rule is satisfied. In response to the precondition not being satisfied, the confidence module 190 may continue at operation 1114. In response to the precondition being satisfied, the confidence module 190 may apply, at operation 1122, the rule. Then, the confidence module 190 may continue at operation 1124, where the confidence module 190 may adjust the confidence index based on results of applying the rule. The confidence module 190 may then continue at operation 1114.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments may be defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

What is claimed is:

1. A method, comprising:
maintaining, by a server system, confidence index values corresponding to a set of computing assets that are available to the server system to provide a computing service over a network to remote client devices, wherein a given confidence index value is indicative of readiness of a corresponding computing asset in providing the computing service, wherein the confidence index values include a confidence index value reflecting a likelihood that a given computing asset is registered with a cloud platform and ready for use by the cloud platform, and wherein the set of computing assets comprises physical or virtual computing devices;
receiving from a first client device a request for a computing resource associated with the computing service;
comparing one or more first confidence index values for a first computing asset of the set of computing assets to one or more second confidence index values for a second computing asset of the set of computing assets;
selecting, for use in responding to the request, data from the one of the first computing asset or the second computing asset having one or more associated confidence index values indicating a greater readiness for providing data; and
using, by the server system, the selected data to respond to the request.

2. The method of claim 1, wherein maintaining the confidence index values includes adjusting, by the server system, the confidence index values based on one or more confidence index rules.

3. The method of claim 2, wherein the confidence index rules are applicable to consider characteristics of computing assets in the set of computing assets, the characteristics including one or more of: network communication activity, management by a network resource manager, changing to a different operational state, or duration of operation.

4. The method of claim 1, wherein the confidence index values further include a confidence index value reflecting a likelihood that the given computing asset is provisioned with an operating system.

5. The method of claim 1, wherein the confidence index values further include a confidence index value reflecting a likelihood that the given computing asset is in service to an application or function in a data center.

6. The method of claim 1, wherein the confidence index values further include a confidence index value reflecting a likelihood that the given computing asset is in a process of being placed into condition to be registered with the cloud platform.

7. The method of claim 1, wherein:
the confidence index values include a set of multiple confidence index values corresponding to the given computing asset; and
the set of multiple confidence index values includes confidence index values corresponding to different possible states of the given computing asset.

8. A non-transitory, computer-readable medium having instructions stored thereon that are executable by a server system to perform operations comprising: maintaining confidence index values corresponding to a set of computing assets that are available to the server system to provide a computing service over a network to remote client devices, wherein a given confidence index value is indicative of a readiness of a corresponding computing asset in providing the computing service, the confidence index values include a confidence index value reflecting a likelihood of two or more of a cold cache state, a warm cache state, an allocated state, a faulty state or an end-of-life state for that a given computing asset is registered with a cloud platform and ready for use by the cloud platform, and wherein the set of computing assets comprises physical or virtual computing devices; comparing one or more first confidence index values for a first computing asset of the set of computing assets to one or more second confidence index values for a second computing asset of the set of computing assets; selecting, for use in responding to a request from a first client device, data from the one of the first computing asset or the second computing asset having one or more associated confidence index values indicating a greater readiness for providing data; and using the selected data to respond to the request.

9. The non-transitory, computer-readable medium of claim 8, wherein maintaining the confidence index values includes adjusting the confidence index values based on one or more confidence index rules.

10. The non-transitory, computer-readable medium of claim 9, wherein the confidence index rules are applicable to consider characteristics of computing assets in the set of computing assets, the characteristics including one or more of: network communication activity, management by a network resource manager, changing to a different operational state, or duration of operation.

11. The non-transitory, computer-readable medium of claim 8, wherein the confidence index values further include a confidence index value reflecting a likelihood that the given computing asset is provisioned with an operating system.

12. The non-transitory, computer-readable medium of claim 8, wherein the confidence index values further include a confidence index value reflecting a likelihood that the given computing asset is in service to an application or function in a data center.

13. The non-transitory, computer-readable medium of claim 8, wherein the confidence index values further include a confidence index value reflecting a likelihood that the given computing asset is in a process of being placed into condition to be registered with the cloud platform.

14. The non-transitory, computer-readable medium of claim 8, wherein:
the confidence index values include a set of multiple confidence index values corresponding to the given computing asset; and
the set of multiple confidence index values includes confidence index values corresponding to different possible states of the given computing asset.

15. A server system, comprising:
a set of computing assets that are available to support the server system in providing a computing service over a network to remote client devices, wherein the set of computing assets is implemented in a cloud computing environment;
at least one processor; and
a non-transitory, computer-readable medium having instructions stored thereon that are executable by the at least one processor to cause the server system to:
maintain confidence index values corresponding to the set of computing assets, wherein a given confidence index value is indicative of a readiness of a corresponding computing asset in providing the computing service, wherein the confidence index values include a confidence index value reflecting a likelihood that a given computing asset is registered with a cloud platform and ready for use by the cloud platform, and wherein the set of computing assets comprises physical or virtual computing devices;
receive from a first client device a request for a computing resource associated with the computing service;
select, based on the confidence index values, data from a computing asset within the set of computing assets having one or more associated confidence index values indicating a readiness for providing data associated with the computing resource; and
use the selected data to respond to the request.

16. The server system of claim 15, wherein the instructions are further executable to cause the server system to adjust the confidence index values based on one or more confidence index rules.

17. The server system of claim 16, wherein the confidence index rules are applicable to consider characteristics of computing assets in the set of computing assets, the characteristics including one or more of: network communication activity, management by a network resource manager, changing to a different operational state, or duration of operation.

18. The server system of claim 15, wherein the confidence index values further include a confidence index value reflecting a likelihood that the given computing asset is provisioned with an operating system.

19. The server system of claim 15, wherein the confidence index values further include a confidence index value reflecting a likelihood that the given computing asset is in service to an application or function in a data center.

20. The server system of claim 15, wherein the confidence index values further include a confidence index value reflecting a likelihood that the given computing asset is in a process of being placed into condition to be registered with the cloud platform.

* * * * *